United States Patent
Hedges et al.

(10) Patent No.: US 6,519,029 B1
(45) Date of Patent: Feb. 11, 2003

(54) LOW COST TRANSMITTER WITH CALIBRATION MEANS FOR USE IN POSITION MEASUREMENT SYSTEMS

(75) Inventors: Thomas M. Hedges, Great Falls, VA (US); Scott Casteel, Fairfax, VA (US); Thomas Cuff, Frederick, MD (US); Timothy Pratt, Blacksburg, VA (US); Rick Slater, Reston, VA (US); Donald Todd, Lottsburg, VA (US)

(73) Assignee: Arc Second, Inc., Dulles, VA (US)

( * ) Notice: Subject to any disclaimer, the term of this patent is extended or adjusted under 35 U.S.C. 154(b) by 0 days.

(21) Appl. No.: 09/532,100

(22) Filed: Mar. 21, 2000

Related U.S. Application Data

(60) Provisional application No. 60/125,545, filed on Mar. 22, 1999.

(51) Int. Cl.[7] ................................ G01B 11/26
(52) U.S. Cl. .................. 356/141.4; 356/4.08; 356/141.5
(58) Field of Search .................. 356/141.4, 4.08, 356/152.1, 141.5, 141.3; 702/150–153

(56) References Cited

U.S. PATENT DOCUMENTS

| | | | |
|---|---|---|---|
| 4,441,809 A | 4/1984 | Dudley et al. | |
| 4,818,107 A | 4/1989 | Ono et al. | |
| 4,820,041 A | 4/1989 | Davidson et al. | |
| 4,874,238 A | 10/1989 | Ochi et al. | |
| 5,100,229 A | 3/1992 | Lundberg et al. | |
| 5,247,487 A | 9/1993 | Beliveau et al. | |
| 5,294,970 A | * 3/1994 | Dornbusch et al. | |
| 5,307,368 A | 4/1994 | Hamar | |
| 5,884,239 A | 3/1999 | Romanik, Jr. | |

FOREIGN PATENT DOCUMENTS

GB    2 213 673    8/1989

* cited by examiner

Primary Examiner—Stephen C. Buczinski
(74) Attorney, Agent, or Firm—Rader, Fishman & Grauer PLLC

(57) ABSTRACT

An improved, low-cost optical transmitter and method useful in a three-dimensional measurement system wherein a plurality of operational parameters of said transmitter are calibrated during manufacture/assembly process to generate unique calibration data for each optical transmitter including data defining angles of each transmitter's first and second radiant fan beams and the angle between the beams when the transmitter is leveled for operation in the system and wherein a detector/receiver in the system distinguishes between radiant beams from a plurality of individual transmitters operable within a given measurement field as a function of the selectively alterable rotational velocity calibration data for each of said transmitters and wherein said angular calibration data for each transmitter is operationally available to each detector/receiver operable in the system.

20 Claims, 16 Drawing Sheets

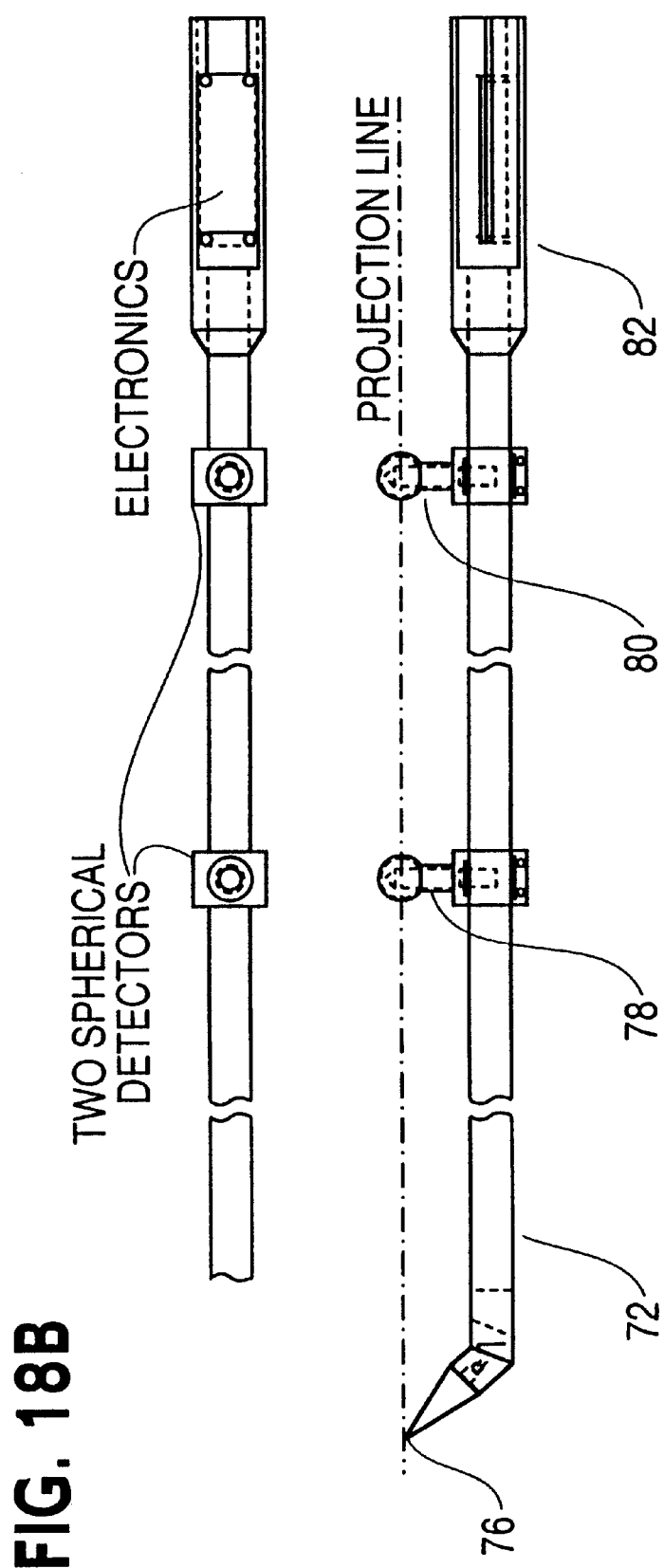

LOW COST TRANSMITTER WITH CALIBRATION MEANS FOR USE IN POSITION MEASUREMENT SYSTEMS

CROSS-REFERENCE TO RELATED APPLICATIONS

This application claims the priority of the previously filed U.S. provisional application serial No. 60/125,545 assigned to the assignee of this application and filed on Mar. 22, 1999 and a PCT/U.S. application serial number 99/23615 entitled Rotating Head Optical Transmitter for Position Measurement System filed on Oct. 13, 1999 both of which applications are incorporated herein by this reference.

BACKGROUND OF THE INVENTION

1. Field of the Invention

This invention relates in general to the field of position measurement and more particularly to an improved apparatus and method of providing position-related information.

2. Description of Related Art

A variety of techniques are known in the art to measure position, including land surveying techniques and global positioning satellite ("GPS") system techniques.

Many of these techniques are limited by high cost apparatus often due to the complexity of manufacturing complex devices with high precision and accuracy. Additionally, many of these techniques required extensive training, and therefore are not usable by those not trained in the art.

It is an object of the present invention to provide an improved low cost optical transmitter which overcomes many of the problems associated with prior art position measurement systems.

SUMMARY OF THE INVENTION

The system described in this disclosure contains, at a high level, several transmitters and a receiving instrument. The transmitters transmit signals from their stationary locations and the receivers receive these signals. In the present system, laser beams and LEDs are used as the signals. The receiving instrument then determines a coordinate system and calculates its position and assorted other information of interest from these received signals. The receiving instrument then displays this information through a user interface. The information may be, for example, the location of the receiving instrument or its distance relative to another location.

As is clear from the present disclosure, the present invention can be applied to a variety of different fields, applications, industries, and technologies. The present invention can be used, without limitation, with any system in which information related to position must be determined, including without limitation movement, dimensional measurement, and position and orientation tracking. This includes without limitation many different processes and applications involved in myriad industries. Some of these industries and some of their associated processes or applications are: film making (digitizing models, virtual sets, camera tracking, automatic focusing), construction (trades, power tools, surveying, CAD, equipment control, construction measurement and layout), robotics (robot calibration, work cell configuration, mobile robot navigation, hazardous waste excavation), law enforcement (accident scene mapping, crime scene mapping, incident reconstruction), computers (3D input devices, video games), virtual reality (augmented reality, virtual arcades, 3D Internet experiences), manufacturing (factory automation, facility decommissioning, parts inspection, facility maintenance, manufacturing tooling and inspection, manufacturing measurement), medical (surgical navigation, smart operating rooms, medical instrumentation), and defense (ordnance modeling, simulation training, aircraft fit-checks, ship retrofit and repair, site remediation).

Various figures are included throughout this disclosure to illustrate a variety of concepts, components of several subsystems, manufacturing processes, and assembly of several subsystems.

1. Transmitter

The present invention can be used in conjunction with the techniques and apparatus described in co-pending provisional patent application U.S. Ser. No. 60/104,115 to Pratt, also assigned to the present assignee, filed on Oct. 13, 1998, and incorporated herein by reference. The following description in this section is intended to highlight certain features of the incorporated provisional. Certain attached figures, including the "Rotor/Bearing Housing Assembly" figure, the "Laser Assembly" figure, and the "Asymmetric Pulse Effect" figure, provide additional detail. Additional figures also depict various (i) components of a transmitter, (ii) manufacturing processes for parts of a transmitter, and (iii) operational concepts, including beam fanning, tracking, and mathematics, which are related to a transmitter

A. Simplified Optical Path

As is clear from the incorporated application, one of the key advantages of the Arc Second transmitters is the simplification of the optical paths as exemplified by the lasers rotating with the head. Additionally, there is no window in the preferred transmitter. Therefore, there is no distortion introduced by the movement of the laser beam across a window. As described, the preferred embodiment utilizes a lens or other device which rotates with the laser. Thus, there is no distortion caused, for example, by variable window characteristics or angles of incidence or between a rotating lens and a fixed laser. The absence of a fixed window also simplifies manufacture, maintenance, and operation. The absence of a fixed window does require that a rotating seal be added to the transmitter.

B. Speed of Rotation and Storage of Parameters

As is also described in the incorporated patent application, the rotating head, and the lasers within it, rotate through a full 360 degrees at a constant, although configurable, velocity. Having an easily quantifiable center of rotation simplifies the algorithms for determining position and can simplify the set-up of the system. This determination is also simplified by the utilization of the synchronization signal which fires, in the preferred embodiment, once per revolution of the rotating head. For accuracy in a position measurement system, the angular velocity of the rotating head must not change during each revolution of the head.

The velocity of the rotating head is configurable through the use of, in the preferred embodiment, a field programmable gate array ("FPGA"). Such configurable speed control allows the transmitters to be differentiated by a receiver based on the transmitters' speed of rotation. The use of multiple transmitters, as is appreciated by those of ordinary skill in the art, enhances position detection. Other advantages are obtained through the use of programmable electronics (FPGAs, flash memory, etc). Not only can the desired speed be set by changing the clock to the phase locked loop which controls motor speed, but the overall gain of the control loop can be programmed to maximize performance at the velocity of interest.

C. Beam Type and Number

As described in the incorporated provisional and known in the art, position detection is also enhanced by using multiple beams and controlling the shape of those beams. These beams may be in the same rotating head assembly or in separate rotating head assemblies.

Two beams is the preferred number per rotating head assembly, however, more beams can be used. In particular, another embodiment uses four beams, two for short range and two for long range. The two short-range beams should have fan angles as large as possible. This allows the user to operate near the transmitters, such as in a room. For long-range, the user would normally be operating away from the transmitters. Therefore, in that circumstance the vertical extent of the beams could be reduced to maximize the range of the system. The beams are, preferably, of type III laser. However, the rotation of the beams reduces their intensity to the fixed observer such that they can be classified as type I lasers. Safety features are integrated into the device to prevent the powering of the lasers when the rotating head is not in motion. In the preferred embodiment at least two interlocks are utilized. The first depends on the phase lock loop. The lasers are turned off until the system is in phase-lock for at least 1024 phase-clock-cycles (approximately 32 revolutions). The second is monitoring the absolute speed using the once-per-rev index on the encoder. A tolerance is programmed into the system, currently 1-part-in-1000. When the velocity is outside that window the laser is not allowed to operate.

D. Beam Shape

The Transmitter allows flexibility in setting beams for the application. One advantage is that the beam shape can be modified for the application. The key is that the beam shape should correspond with correctly filling the desired work volume. For construction trades this might be a room 20 m×20 m×5 m in size. For construction machine control this might be a space 100 m×100 m×10 m in size. By modifying the beam shape, the energy can be properly directed.

The beam shape can also be controlled to differentiate beams. This can be done for multiple beams on a given transmitter or on different transmitters. For a given transmitter, the first and second beams must be differentiated. One technique uses their relative position with respect to the strobe in time. Another technique is to assure that the beams have different widths ("beam width" or "divergence angle"). Then, for instance, the first beam could be the "larger" of the two beams.

Fanning the beam can be done using a variety of methods known in the art, including without limitation, rod lenses, pal lenses, and cylindrical lenses. The use of rod lenses offers a relatively simple approach, whereas the use of pal lenses offers greater control over the energy distribution. The beam typically is emitted from the source as a conical beam, then a collimating lens shapes the beam into a column, then the fanning lens fans the column.

Rod lenses can be used to increase control on divergence. One of the major advantages of rod lenses for line generation is that they do not directly affect the quality of the beam in the measurement direction (beam direction). Therefore, they should not affect the divergence of the laser beam as set by the collimating optics.

Pal lenses can be used to increase control of the energy distribution in the fan direction. PAL type lenses can even create "uniform" distributions, where the energy is uniform in the direction of the fan plane. A uniform distribution is often inefficient, however, if potential receivers are not uniformly distributed along the entire fan plane. In some implementations a focus must be created before the lens. In that implementation, the use of the PAL technique could affect the beam in the measurement direction.

Gaussian beams can also be used to maximize the performance of the receiver. Gaussian beams are symmetric beams in that the energy distribution across the divergence angle or beam width is symmetric. When a simple threshold technique is used in the receiver, it important that the pulses be symmetric and be without shoulders or sidelobes. It is also helpful if the distribution's shape does not change with range. There are several pulse shapes that meet many of these criteria. However, the Gaussian distribution meets all of these criteria. With symmetric pulses that do not have shoulders or sidelobes, the receiver will be able to detect the center of the beam. Non-symmetric pulses, conversely, can cause the receiver to falsely identify the exact time when the beam center intersects the receiver's optical detector.

E. Strobe

In a disclosed embodiment, the strobe pulse must be symmetric and pulse shaping in the flash/strobe pulse generator is required. With a simple thresholding technique, it is important that the strobe pulse be symmetric. A square pulse with equal rise and fall times is one desired pulse shape. The light output of the LEDs is directly to the current flowing through the LEDs. Because of the high currents involved in creating the strobe pulse, a pulse-forming network must be used to assure that the current is a square wave as it passes through the diodes. The ideal strobe pulse produces in the optical detector of the receiver a pulse shape identical to a laser pulse.

F. Communications and Control

A disclosed system uses a serial port for communication and control. This allows calibration data and control parameters to easily be transferred. Recall that the transmitters are differentiated by their speeds. Therefore a technique must be put in place to simplify the speed changes. Additionally, the transmitter parameters must be made available to the receiver. To create a simple, reliable, and unified technique the preferred embodiment uses serial communication between the transmitter and the receiver or test equipment. For test purposes, the serial connection is a well-known RS-232 connection. For used in the field, the connection is through an infrared serial port. This allows the transmitter to be sealed and yet communicate with the outside world. To avoid interference with the measurement technique, this port is only active when the lasers are off.

G. VHDL

Many of the digital designs of a disclosed embodiment are implemented in field programmable gate arrays (FPGAs). These devices allow complex designs to be programmed into general-purpose hardware available from multiple vendors. The programs for these devices are written in a special computer understandable language VHDL (Very high-speed integrated circuit] Hardware Description Language). This is the same language that is used to design microprocessors and other semiconductor devices and is now standardized as IEEE 1076.

H. Providing Power to the Laser Head

As explained in the incorporated provisional application, the motor and the provision of power to the rotating head assembly are key components of a transmitter according to the preferred embodiment.

A rotary transformer is used. Several techniques are available for powering devices in a rotating head. The most common is the use of slip rings. Unfortunately, slip rings require physical contact between the "brushes" and the "slip-ring". This creates dust in the system and can cause variations in motor speed a frictional torque varies. The preferred technique is to use a rotating transformer. The transformer technique causesminimal drag on the motor. Additionally, through the use of flat signal transformers as power transformers, the technique is very compact.

Fly-back control is used on the stator side of the transformer. To minimize the number of components in the rotating head, the voltage control is performed on the stator side of the transform. To optimize efficiency, a fly-back driving technique is utilized.

I. Stability and Precision of Rotation

The stability of the speed control system and drive motoris also discussed in the incorporated application. As those of ordinary skill in the art will recognize, a sine wave drive motor is a low-cost motor with good inherent stability intra-revolution and, as such, is useful in ensuring constant velocity rotation.

The bearing separation should be maximized to achieve optimal results. Any precession and wobble (wow and flutter in a turntable) will be a source of error in the system. It will lead directly to an error in the "z" direction. Using two precision bearings and maximizing the distance between the bearings can minimize these errors.

The strobe pulses are triggered by a once-per-revolution indicator tied to the motor shaft. There are many ways to create this shaft position index. The simplest and preferred technique is to use the index normally supplied with an optical encoder. This separate output of the encoder is directly equivalent to a shaft position index.

The optical encoder disk is used to give rotation information. Other devices, including without limitation, tachometers and synchros could be used. The optical encoder disk is typically made of glass and has a series of radial marks on it which are detected as the disk rotates. Additionally, the disk typically has a single "index" mark of a different radius which is used to detect complete rotations. The disk system produces a square wave with a frequency dictated by the speed with which the radial marks are passing. For example, if the disk is rotating at 1 revolution/second, a 1000 mark disk system would produce a 1000 Hz square wave (1000 radial marks/revolution * 1 revolution/second=1000 Hz).

The speed of the motor is controlled through a feedback phase-locked loop (PLL) system. The disk system square wave is one input and a clock from the transmitter system is the other input. The transmitter clock has a selectable frequency. The output of the PLL is used to control the speed of the motor rotation such that the PLL remains locked at the selected frequency.

The index mark of the disk can also be used to initiate the strobe pulse as often as once/revolution.

J. Low Manufacture Cost

As more fully described in herein after regarding the calibration facility, a transmitter needs to be stable. Further, it is important for the receiving instrument to know, with precision, the operating parameters of the transmitter. The present manufacturing process for the transmitter specifies these operating parameters with less precision than that required by the receiving instruments. This allows the manufacturing process to be relatively inexpensive. The required precision is obtained in the characterization process, which utilizes the calibration facility described below.

2. Calibration

As discussed below the calibration facility explains the process of determining several key parameters of the transmitter. These parameters need to be provided to the receiving instrument in order to allow the receiving instrument to make the position calculations. Preferably, these parameters are stored in memory in the position calculation engine (PCE) and can be updated as required. For example, if a new transmitter is added to the system, then a new set of parameters needs to be loaded into the PCE. As an additional example, if the rotation speed of a transmitter is changed, then this information needs to be updated in the PCE.

3. Receiving Instrument

In the present system, the preferred receiving instrument is a wand, which is shown in FIG. 18A known as a Walk-About Receiver, and one end of the wand contains a hand-held gun-shaped unit called the Vulcan Receiver, as shown in the FIG. 19. Both of these instruments in earlier versions were commercially available from Arc Second, Inc. of Dulles Va. The wand preferably contains two detectors/receivers.

In the "Vulcan Receiver" FIG. 18, there is shown a Position Calculation Engine ("PCE") which performs most of the computations of the receiving instrument. The PCE as herein after explained is integral in the set-up procedure, tracking, position calculation, and information display.

The Smart Tip can also perform computations, as indicated by the FPGA (field-programmable gate array) and the "i Button" in each Smart Tip. The Smart Tip can be present at either end in the present system and the signal "Tip Present" indicates whether there is a Smart Tip on each of the ends.

The wand provides a lightweight, mobile receiving instrument. Herein after there is a more detailed description of the operation of the wand as well as its configuration and the determination of the location of the wand tip.

4. Position Measurement Systems

As hereinafter explained, the mathematical description of the transmitter and its use in position determination are more fully explained and is a function performed primarily in the PCE.

In accordance with an aspect of the present invention, the functionality disclosed herein can be implemented by hardware, software, and/or a combination of both. Software implementations can be written in any suitable language, including without limitation high-level programming languages such as C++, mid-level and low-level languages, assembly languages, and application-specific or device-specific languages. Such software can run on a general purpose computer such as a 486 or a Pentium, an application specific piece of hardware, or other suitable device. In addition to using discrete hardware components in a logic circuit, the required logic may also be performed by an application specific integrated circuit ("ASIC"), a programmed programmable logic device ("PLD"), or other device. The system will also include various hardware components which are well known in the art, such as connectors, cables, and the like. Moreover, at least part of this functionality may be embodied in computer readable media (also referred to as computer program products), such as magnetic, magnetic-optical, and optical media, used in programming an information-processing apparatus to perform in accordance with the invention. This functionality also may be embodied in computer readable media, or computer program products, such as a transmitted waveform to be used in transmitting the information or functionality.

The principles, preferred embodiments, and modes of operation of the present invention have been described in the foregoing disclosure. The invention is not to be construed as limited to the particular forms disclosed, because these are regarded as illustrative rather than restrictive. Moreover, variations and changes may be made by those skilled in the art without departing from the spirit and scope of the invention.

BRIEF DESCRIPTION OF THE DRAWINGS

The above described novel aspects of applicants' improved apparatus and methods for position measurements can be better understood with reference to the attached drawings, in which:

FIGS. 18A and 18B are perspective views of receiver/detector combinations utilized in accordance with applicants' inventions.

DETAILED DESCRIPTION OF THE PREFERRED EMBODIMENTS

1. The Transmitter
A. Physical Description

Figure 1:
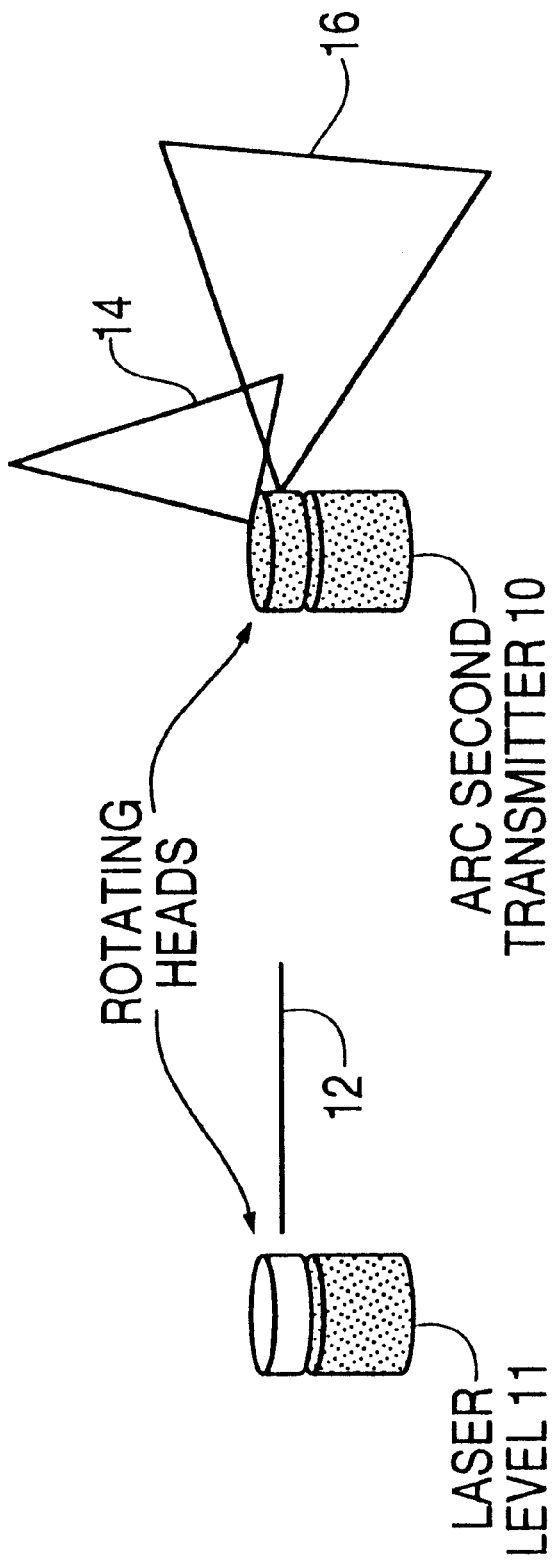
FIG. 1 is a pictorial view of applicants' improved optical transmitter contrasted with prior art laser spot beams.

The Arc Second transmitter 10 is a device physically similar to a rotating laser 11 except that instead of a single rotating spot beam 12, the transmitter 10 emits two rotating fan beams 14 and 16 as shown in FIG. 1.

Figure 2:
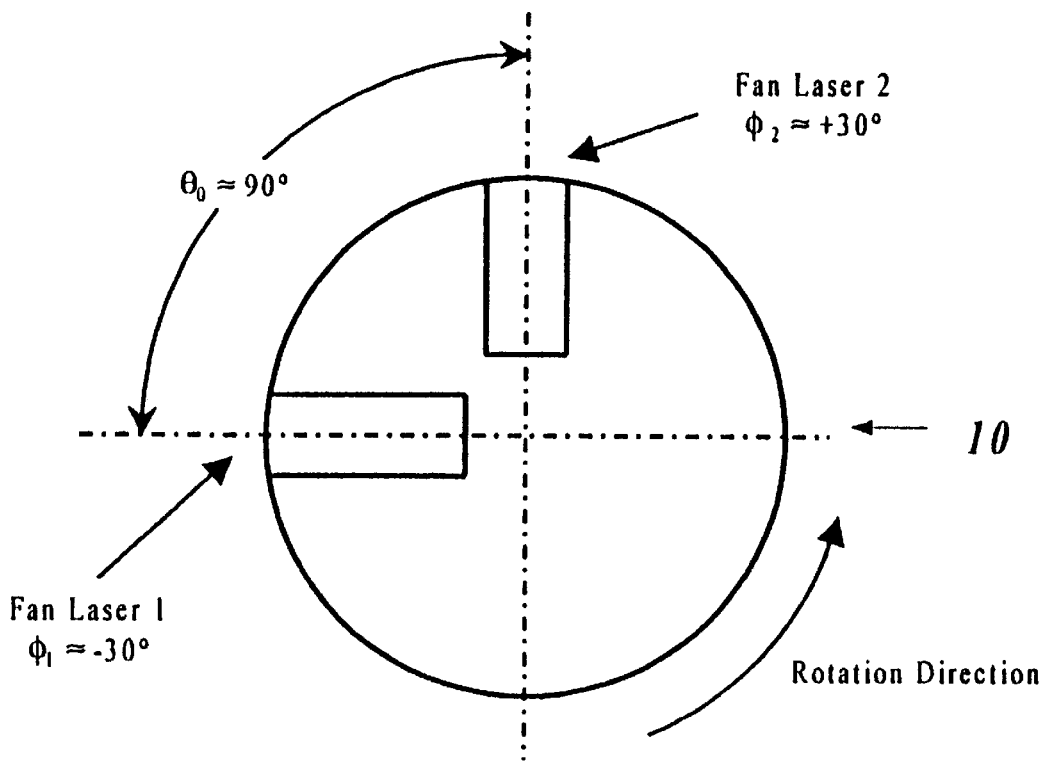
FIG. 2, FIG. 2A and FIG. 2B are a schematic top and section views illustrating the preferred embodiments of applicants' novel optical transmitter apparatus.
Figure 2A:
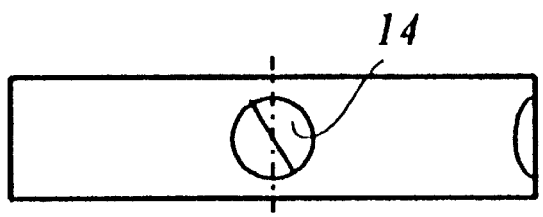
Figure 2B:
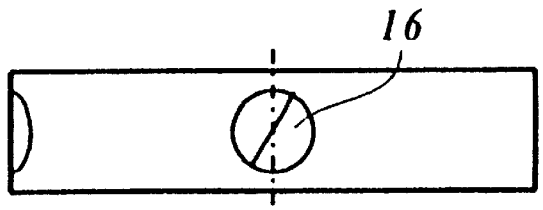

FIG. 2 shows the preferred assembly of the transmitter head 10. There are three important angles in the figure: $\theta_{Off}$, $\phi_1$, and $\phi_2$. $\theta_{Off}$ describes the angular separation between the two laser modules in the rotating head as viewed from the top. The lasers are nominally spaced 90° apart. $\phi_1$, and $\phi_2$ describe the tilt of the fan plane of laser 1 and laser 2, respectively. These two angles are measured from vertical, and are nominally set to −30° for beam 1 and +30° for beam 2 as shown in the figure. We explain the sign convention for these angles in the next section. The actual values for $\theta_{Off}$, $\phi_1$, and $\phi_2$ are determined through a factory calibration process, which is described hereinafter.

As the transmitter head 10 rotates, it scans the measurement field more fully described hereafter with two planes of light 14 and 16. The measurement tool, not shown, is illuminated by each laser's fan plane exactly once during a rotation of the head. In addition to this scanning operation, the transmitter also fires an optical strobe at a fixed point in the head's revolution. The strobe illuminates the measurement tool and is used to provide a zero reference for the rotation of the head. This scanning process provides the basis for the measurements made by the receiver system and will be described in more detail hereinafter.

Finally, each transmitter in a position measurement system rotates at a known and unique rate. This unique rotational rate allows the software in the receiver system to differentiate between the transmitters surrounding the measurement volume.

B. Low Cost Transmitter Detailed Description

Figure 3:
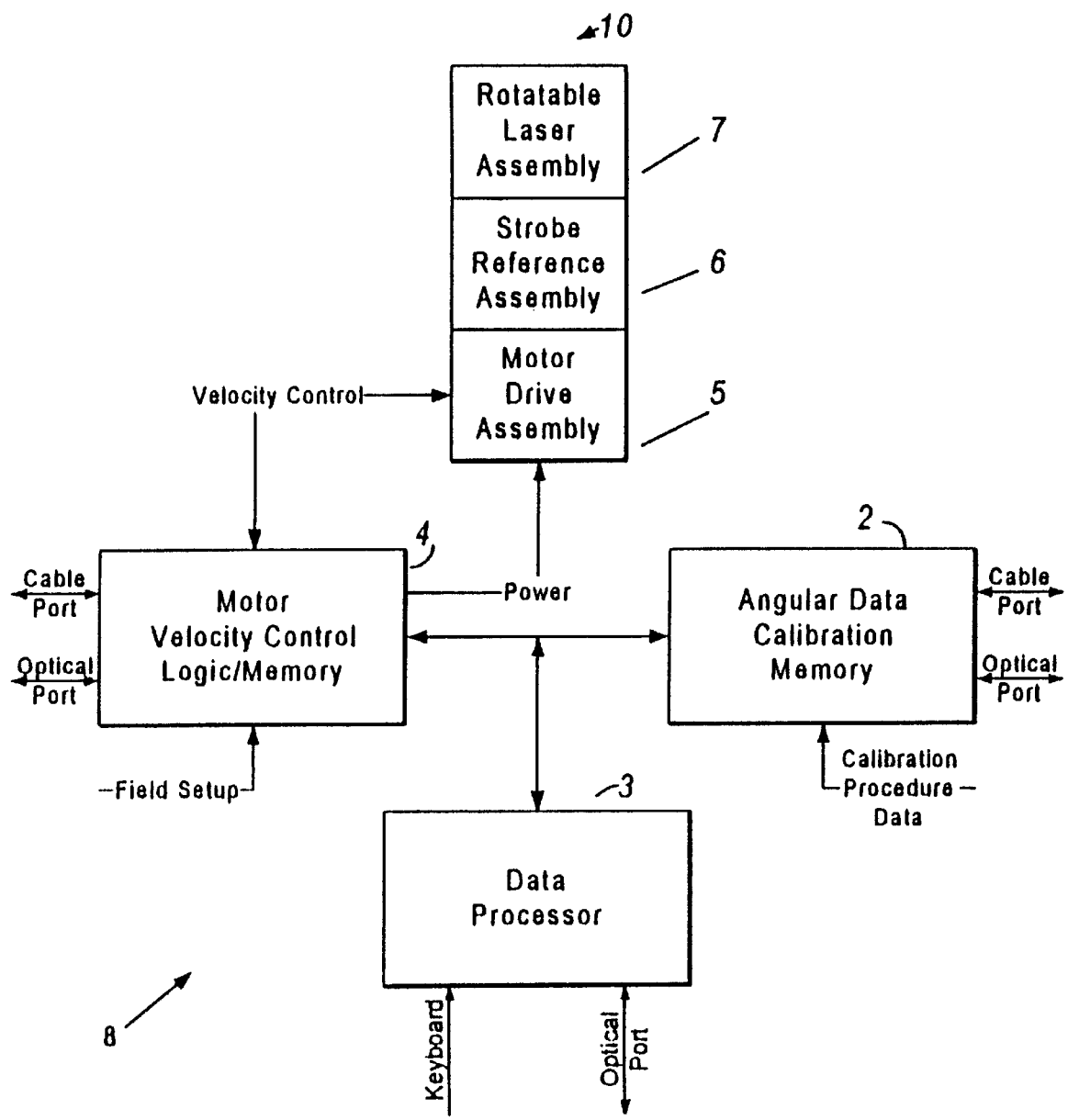
FIG. 3 is a block diagram of various novel calibration data means of applicants' improved optical transmitter for position location apparatus and methods.

An improved, low cost optical transmitter useful in a three dimensional measurement system in accordance with several novel aspects of applicants' invention is illustrated in the logic block diagram of FIG. 3. Throughout the specification and drawings, like numerals are used to designate like elements.

In order to achieve a low cost optical transmitter and method, applicants' manufacturing process, as hereinafter will be more fully explained, utilize a calibration procedure during the manufacture/assembly process to generate unique data for characterizing each optical transmitter 10 rather than employing a much higher cost precision assembly process. In accordance with one aspect of applicants' invention the angular calibration data is generated during the manufacture/assembly process to define the respective angles of each transmitter's first and second radiant fan beams and the angle between the beams when the transmitter is leveled for operation as more fully described in conjunction with FIGS. 1 and 2. This angular calibration data is preferably stored in calibration data memory 2. In addition, data defining the desired rotational velocity can be preloaded during the manufacturing process and can likewise be loaded into calibration data memory 2 or variable motor control memory 4. As will hereinafter be more fully explained a receiver/detector 24 (see FIG. 12) distinguishes between radiant beams from a plurality of individual transmitters 10 operable within a single measurement field as a function of the alterable rotational velocity for each transmitter 10. As shown calibration data can be entered into memory 2 and memory 4 via a keyboard or optical port associated with data processor 3 which is coupled to memory units 2 and 4. Likewise calibration data from memories 2 and 4 can be outputted to the optical receiver/detector 24 in a measurement system via the cable or optical output ports of memory 2 and 4. As illustrated optical transmitter 10 includes a transmitter motor drive 5 and strobe reference and laser assemblies 6 and 7. As will be more fully explained hereinafter, when a transmitter 10 is introduced into a measurement system the calibration data for each transmitter 10 must be transferred to or loaded into a receiver 24 shown in FIG. 12. Further a field setup data port 8 of variable motor control memory 4 may be used to selectively alter the rotational velocity calibration data of the transmitter assembly and that velocity calibration data must likewise be communicated to the system receiver detector 24. This transfer may be accomplished either through the cable or optical ports of memories 2 or 4 or via the keyboard input of data processor 3.

C. Mathematical Description

A mathematical model will now be set forth that describes the physical scanning operation of the transmitter. We use this model in the next section to derive the position calculation algorithm.

Figure 4:
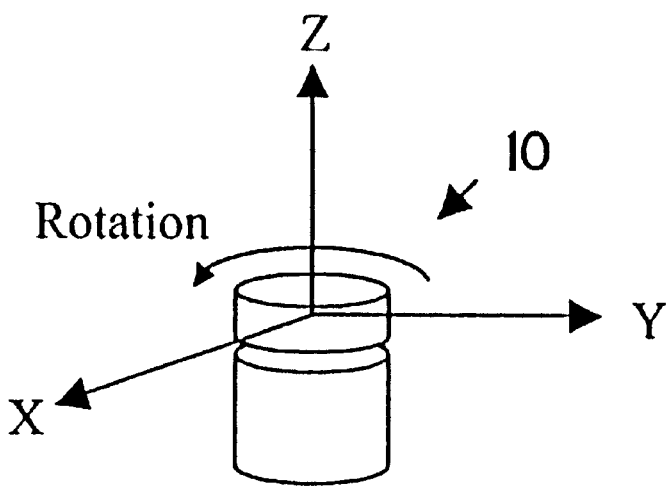
FIG. 4 is a pictorial view of applicants' optical head assembly frame of reference.

Physically, the scanning operation of the transmitter 10 is accomplished with two laser fan beams. The fan beams 14 and 16, see FIGS. 1 and 2, will be considered individually in the math model. To build this model, we first define the transmitter's reference frame as shown in FIG. 4. Each transmitter has its own local reference frame, and these reference frames are different from the user's reference frame as will be explained hereinafter. These frames will be related to the user's reference frame hereinafter. As can be seen from FIG. 4, the head rotates in the positive direction about the z-axis according to the right hand rule.

Figure 5:
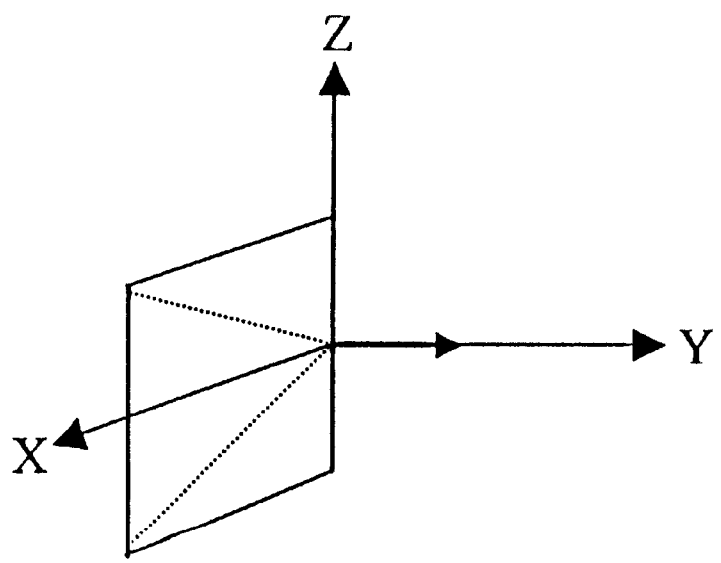
FIG. 5 is a graphic representation of a fan beam according to applicants' improvements.

To describe the scan of a fan beam, we start with a vertical plane at y=0, i.e. a plane in the x-z axis. Mathematically, the plane is represented by a vector normal to its surface. This plane corresponds to the plane of light created by a fan laser that is oriented vertically. In FIG. 5 the plane is drawn as infinite, but in actuality the plane has a finite angular extent as shown by the dotted lines. This angular extent does not affect the math model, but it does impact the angular field of view of the transmitter.

$$\text{Plane defined by } \begin{bmatrix} 0 \\ 1 \\ 0 \end{bmatrix}$$

Figure 6:
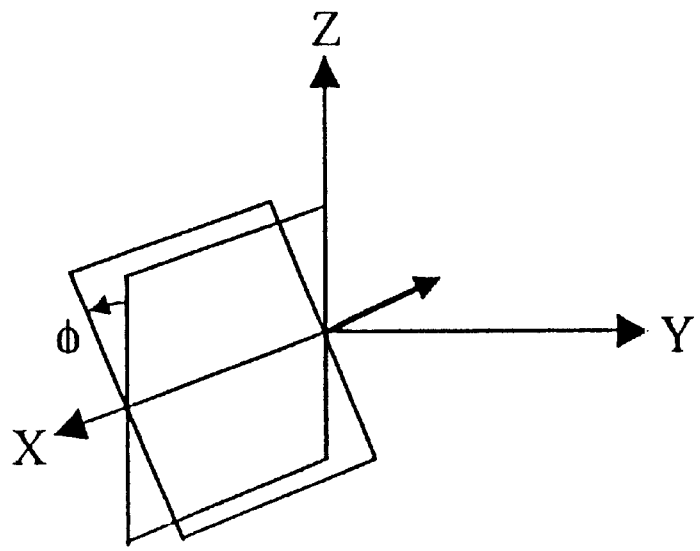
FIG. 6 is a graphic representation of a fan beam rotated about the x axis.

Next, we rotate this vertical plane about the x-axis by an angle $\phi$. This new plane represents a fan laser as inserted into the head of the transmitter. $\phi$ is the physical slant angle described in the previous section. A positive $\phi$ is a right-handed rotation about the x-axis, as shown in FIG. 6.

$$\begin{bmatrix} 1 & 0 & 0 \\ 0 & \cos\phi & -\sin\phi \\ 0 & \sin\phi & \cos\phi \end{bmatrix} \begin{bmatrix} 0 \\ 1 \\ 0 \end{bmatrix} = \begin{bmatrix} 0 \\ \cos\phi \\ \sin\phi \end{bmatrix}$$

Figure 7:
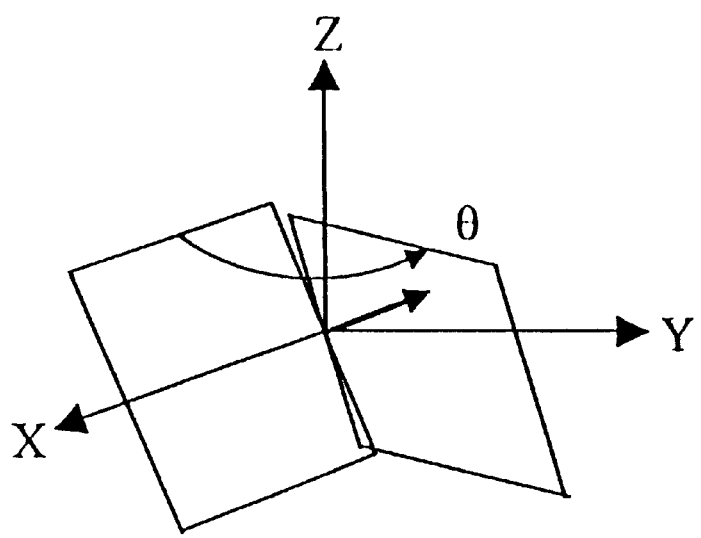
FIG. 7 is a graphic representation of a fan beam further rotated about the z axis.
Figure 13:
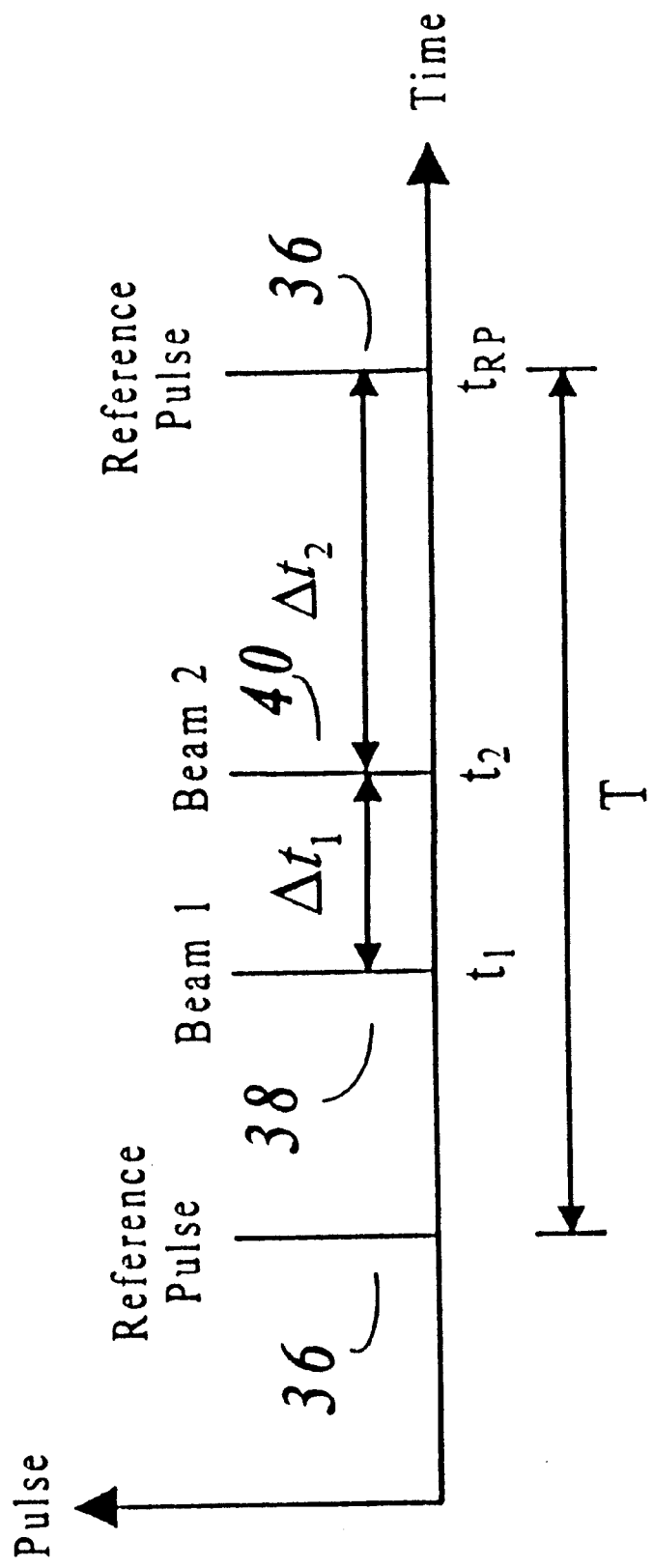
FIG. 13 is a linear time plot of a typical pulse sequence for applicants' improved optical transmitter and method.

Finally, we rotate this new plane about the z-axis by an angle $\theta$. This angle is actually a function of time because it represents the location of the fan beam as the transmitter head 10 rotates about the z-axis, i.e. $\theta(t)$ is the scan angle at time t as shown in FIGS. 7 and 13.

$$\begin{bmatrix} \cos\theta(t) & -\sin\theta(t) & 0 \\ \sin\theta(t) & \cos\theta(t) & 0 \\ 0 & 0 & 1 \end{bmatrix} \begin{bmatrix} 0 \\ \cos\phi \\ \sin\phi \end{bmatrix} = \begin{bmatrix} -\cos\phi\sin\theta(t) \\ \cos\phi\cos\theta(t) \\ \sin\phi \end{bmatrix}$$

Figure 8:
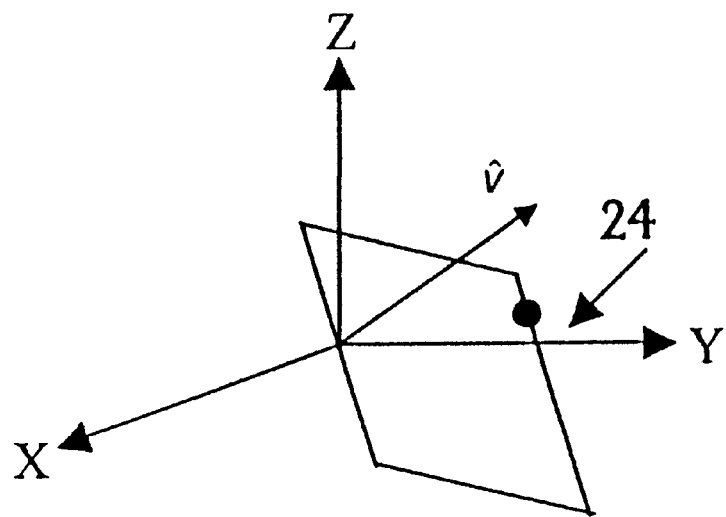
FIG. 8 is a graphic representation of a plane of a fan beam intersecting a detector.

In the position calculation algorithm as hereinafter explained, this vector expression represents the laser fan plane at the point in time when it intersects the detector as shown in FIG. 8. We call this vector expression $\hat{v}$.

$$\hat{v} = \begin{bmatrix} -\cos\phi\sin\theta(t) \\ \cos\phi\cos\theta(t) \\ \sin\phi \end{bmatrix}$$

For each rotation of the transmitter head, the receiver system to be described herein after calculates two $\hat{v}$ vectors, $\hat{v}_1$ and $\hat{v}_2$, that describe the location of the two fan beams at their intersection point with the detector 24. Since $\phi$ is a constant determined through factory calibration, each $\hat{v}$ vector depends solely on its corresponding scan angle $\theta$, which in turn depends on timing measurements made by the receiver system.

2. Position Calculation

There are two possible methods we can use to calculate the position of a detector 24 on the measurement tool: the theodolite network method and the Arc Second non-theodolite transmitter method. In the receiver system illustrated as 24 in FIG. 9, we use the Arc Second method because it is faster and more suited to the transmitter's unique design. We will briefly discuss the theodolite network method first before presenting the Arc Second method.

Figure 10:
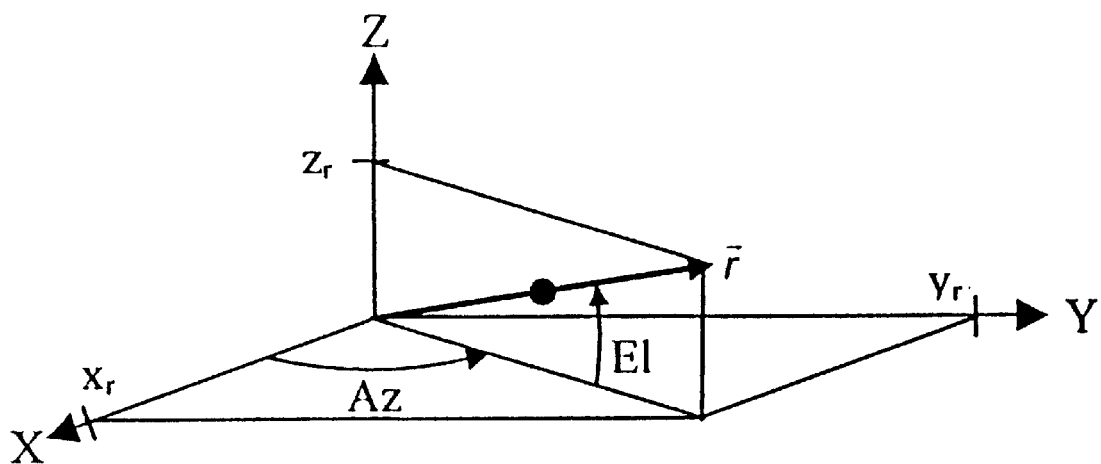
FIG. 10 is a Cartesian plot of vectors representing intersecting fan beam planes.

To use the theodolite network method, the receiver system would calculate the intersection between the measured azimuth-elevation vectors from each transmitter to the desired detector as illustrated in FIG. 10.

Figure 9:
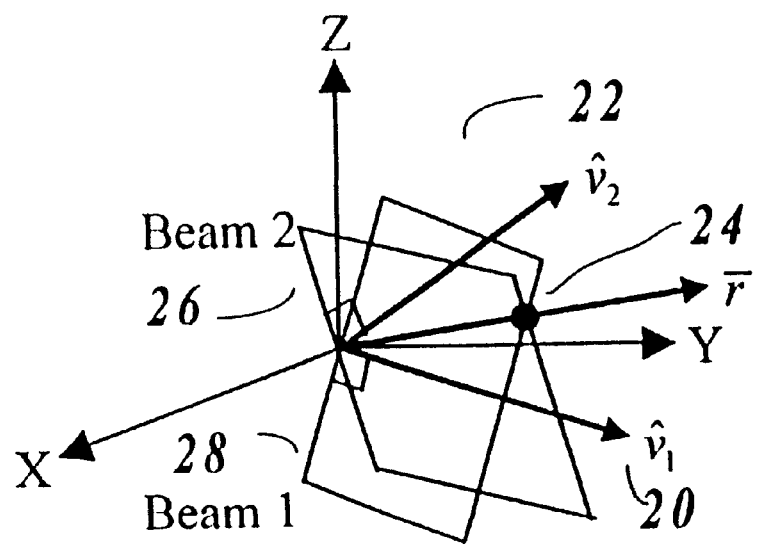
FIG. 9 is a graphic representation of the planes of two fan beams intersecting a detector.

FIG. 9 shows both fan planes 26 and 28 at their point of intersection with the detector 24. The fan planes 26 and 28 intersect one another in a line, and this line is a vector $\vec{r}$ that passes through the detector 24:

$$\vec{r} = \hat{v}_1 \times \hat{v}_2$$

Again, while $\vec{r}$ passes through the detector 24, there is no information about the length of $\vec{r}$ from the vectors $\hat{v}_1$ and $\hat{v}_2$. Therefore, we can only calculate the azimuth and elevation of this vector relative to the transmitter's reference frame as shown in FIG. 10 and expressed in the below equations:

$$az = \tan^{-1}\left(\frac{y_r}{x_r}\right)$$

$$el = \tan^{-1}\left(\frac{z_r}{\sqrt{x_r^2 + y_r^2}}\right)$$

FIGS. 9 and 10 illustrate the limitation of the theodolite method, i.e. it is only possible to determine two dimensions from a single transmitter. We can determine the two angles to the detector 24 but not the distance.

The next step in the theodolite network method is to calculate $\vec{r}$ vectors for all transmitters in the workspace and then calculate the intersection of these vectors. We will not present the mathematics for this method because it requires more calculations than Arc Second's position calculation algorithm and does not take advantage of Arc Second's unique transmitter design. However, in summary, if the baseline between the two theodolites and the angles to a receiver are known, the position of the sensor can be calculated.

Figure 11:
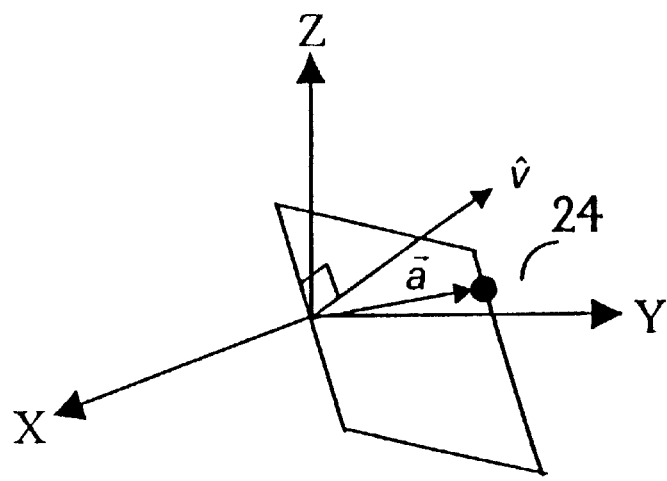
FIG. 11 is a graphic representation of a single fan beam plane illuminating a detector.

In the Arc Second non-theodolite method, we take direct advantage of the transmitter's scanning operation, rather than treating the transmitters as theodolites. In FIG. 11, we once again illustrate a single fan plane intersecting with the detector. Vector $\vec{a}$ is the detector's position relative to the transmitter's origin. From FIG. 11 we may make the important mathematical observation:

$$\hat{v} \cdot \vec{a} = 0$$

The dot product is zero because these vectors are orthogonal to one another at the point when the beam plane intersects with the detector. The vector $\hat{v}$ is perpendicular to the plane by definition, and $\vec{a}$ is contained within the plane when the plane intersects the detector. As we illustrated in FIG. 9, we have two fan planes represented by $\hat{v}_1$ and $\hat{v}_2$, so we actually have two equations per transmitter:

$$\hat{v}_1 \cdot \vec{a} = 0$$

$$\hat{v}_2 \cdot \vec{a} = 0$$

The vector $\vec{a}$ contains three unknowns, (x, y, z), so once again we do not yet have enough information to calculate the third dimension. Adding a third fan beam to the transmitter would add a third row to the equation, but this equation would not be linearly independent from the first two. Hence, we must add at least one additional transmitter.

Figure 12:
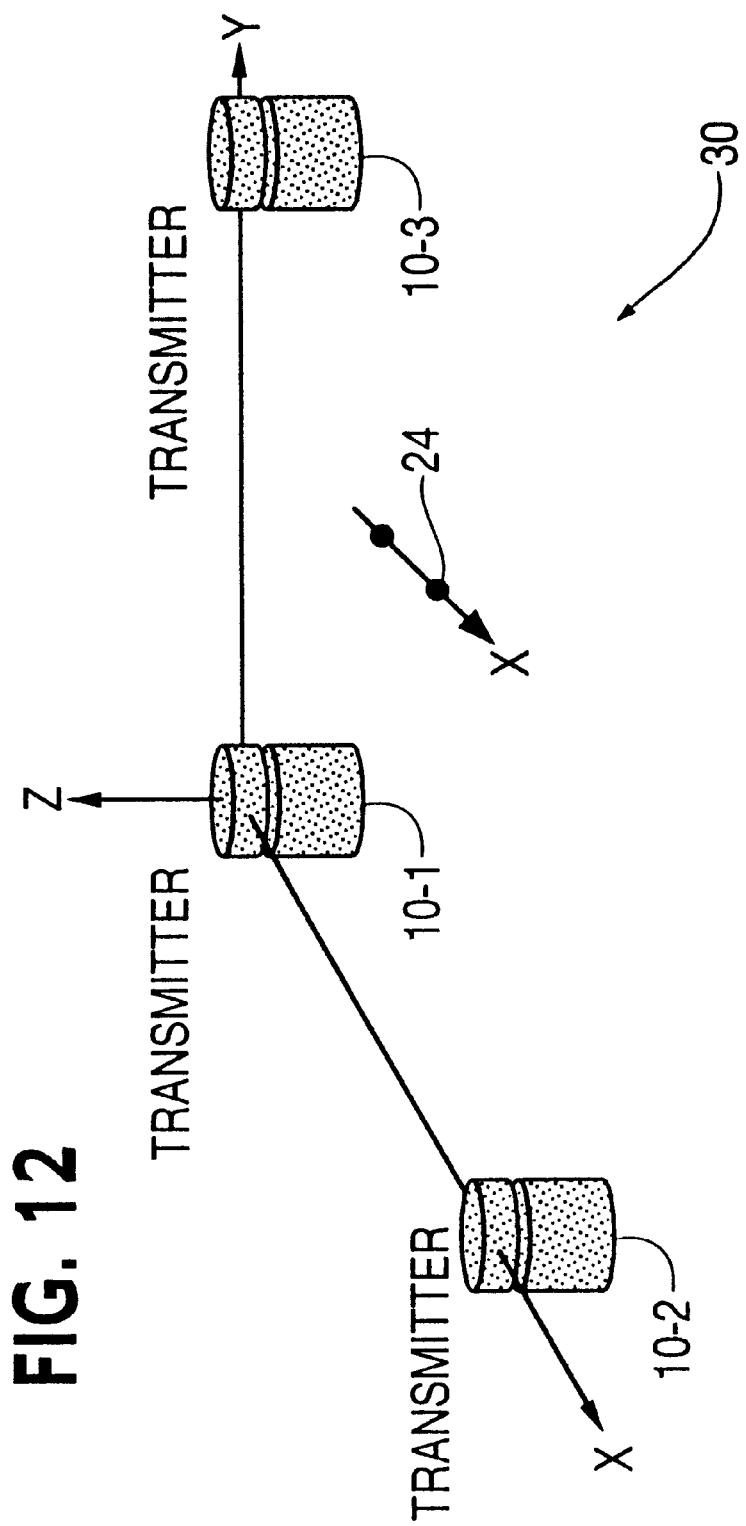
FIG. 12 is a pictorial view of a three transmitter position measurement system embodying aspects of applicants' novel apparatus and method.

In FIG. 12, we have placed one transmitter 10-1 at the origin, a second 10-2 along the x axis, and a third 10-3 along the y axis. This axis setup is somewhat arbitrary but is used to show that the transmitters are tied together in a common reference frame. As previously discussed, we call this common frame the user's reference frame to differentiate it from the transmitters' reference frames described previously.

Since we wish to calculate the location of a detector in the user's reference frame, we need to specify each transmitter's reference frame in terms of the user's reference frame. This is accomplished with a location vector $\vec{p}_{tx}$, and a rotation matrix $R_{tx}$ for each transmitter. We can then re-write the equation as:

$$R_{tx}\hat{v} \cdot (\vec{p} - \vec{p}_{tx}) = 0$$

In this new equation, $\vec{p}$ is the location of the detector in the user's reference frame and is the value we wish to calculate. $R_{tx}\hat{v}$ is the vector describing the laser fan plane in the user's reference frame, whereas $\hat{v}$ itself describes the laser fan plane in the transmitter's reference frame. $\vec{p} - \vec{p}_{tx}$ is a vector from the transmitter's origin to the detector location in user's reference frame. For $n \geq 2$ transmitters, we have the following set of equations.

$$R_1\hat{v}_{1,1} \cdot (\vec{p} - \vec{p}_1) = 0$$

$$R_1\hat{v}_{1,2} \cdot (\vec{p} - \vec{p}_1) = 0$$

$$R_2\hat{v}_{2,1} \cdot (\vec{p} - \vec{p}_2) = 0$$

$$R_2\hat{v}_{2,2} \cdot (\vec{p} - \vec{p}_2) = 0$$

. . .

$$R_n\hat{v}_{n,1} \cdot (\vec{p} - \vec{p}_n) = 0$$

$$R_n\hat{v}_{n,2} \cdot (\vec{p} - \vec{p}_n) = 0$$

The first subscript is the transmitter number and the second subscript on $\hat{v}$ is the laser beam number. In order to write this series of equations in matrix form so that we can solve for $\vec{p}$, we rearrange the equations as follows.

$$R_{tx}\hat{v} \cdot (\vec{p} - \vec{p}_{tx}) = 0$$

$$R_{tx}\hat{v} \cdot \vec{p} - R_{tx}\hat{v} \cdot \vec{p}_{tx} = 0$$

$$R_{tx}\hat{v} \cdot \vec{p} = R_{tx}\hat{v} \cdot \vec{p}_{tx}$$

$$(R_{tx}\hat{v})^T \vec{p} = R_{tx}\hat{v} \cdot \vec{p}_{tx}$$

We note that $(R_{tx}\hat{v})^T$ is a 1×3 vector, $$\vec{p} = \begin{bmatrix} x \\ y \\ z \end{bmatrix},$$

and $R_{tx}\hat{v} \cdot \vec{p}_{tx}$ is a constant. We can then put the equations of these equations into the matrix form:

$$\begin{bmatrix} (R_1\hat{v}_{1,1})^T \\ (R_1\hat{v}_{1,2})^T \\ (R_2\hat{v}_{2,1})^T \\ (R_2\hat{v}_{2,2})^T \\ \vdots \\ (R_n\hat{v}_{n,1})^T \\ (R_n\hat{v}_{n,2})^T \end{bmatrix} \begin{bmatrix} x \\ y \\ z \end{bmatrix} = \begin{bmatrix} R_1\hat{v}_{1,1} \cdot \vec{p}_1 \\ R_1\hat{v}_{1,2} \cdot \vec{p}_1 \\ R_2\hat{v}_{2,1} \cdot \vec{p}_2 \\ R_2\hat{v}_{2,1} \cdot \vec{p}_2 \\ \vdots \\ R_n\hat{v}_{n,1} \cdot \vec{p}_n \\ R_n\hat{v}_{n,2} \cdot \vec{p}_n \end{bmatrix}$$

The shorthand matrix notation is:

$$A_{2n \times 3} \vec{p}_{3 \times 1} = \vec{b}_{2n \times 1}$$

where the subscripts indicate the dimensions of the matrices. In order to calculate the detector's position in the user's reference frame, we simply solve this equation for $\vec{p}$. To do this, we can apply least-squares reduction to the matrix by multiplying both sides by $A^T$. We would then use a standard square-matrix solve such as LU decomposition to find $\vec{p}$. Alternatively, we could also use Singular Value Decomposition to solve for $\vec{p}$ directly. SVD is the preferred method for finding a least-squares solution when the matrix is ill-conditioned, which is a greater possibility when more transmitters are added.

3. Calculating the Scan Angles Using Timing Measurements

As previously discussed, the two $\hat{v}$ vectors from each transmitter 10 are based on the corresponding scan angles, $\theta_1(t)$ and $\theta0_2(t)$, for the two laser fan beams 14 and 16 on the transmitter 10. We now discuss how the receiver system 24 (see FIG. 12) calculates these two scan angles. Specifically, to calculate position for a single detector, we need $\theta_1(t)$ and $\theta_2(t)$ for each transmitter in the workspace 30.

A typical receiver system, to be described hereinafter with reference to FIGS. 18A and 18B, includes a physical tool with a measurement tip and photodiode detector 24 circuitry, a Position Calculation Engine (PCE), and a user interface. As the user moves the tool around in the workspace 30, the photodiode detectors 78 and 80 receives electrical pulses or strikes every time one of the planes of light or one of the optical strobes illuminates a detector 24. Using a high-speed timer, not shown, which preferably is built into the PCE 90, the system makes differential timing measurements between pulses. These timing measurements are then used to calculate the scan angles.

FIG. 13 illustrates a typical pulse sequence for a single rotation of the transmitter head 10. The time between reference pulses, as indicated by T, is the period of one transmitter head revolution. In FIG. 13, the reference pulse 36 is preferably created by the optical strobe 6. The receiver system makes two differential timing measurements, $\Delta t_1$ and $\Delta t_2$, for each rotation of the transmitter head 10.

Figure 14:
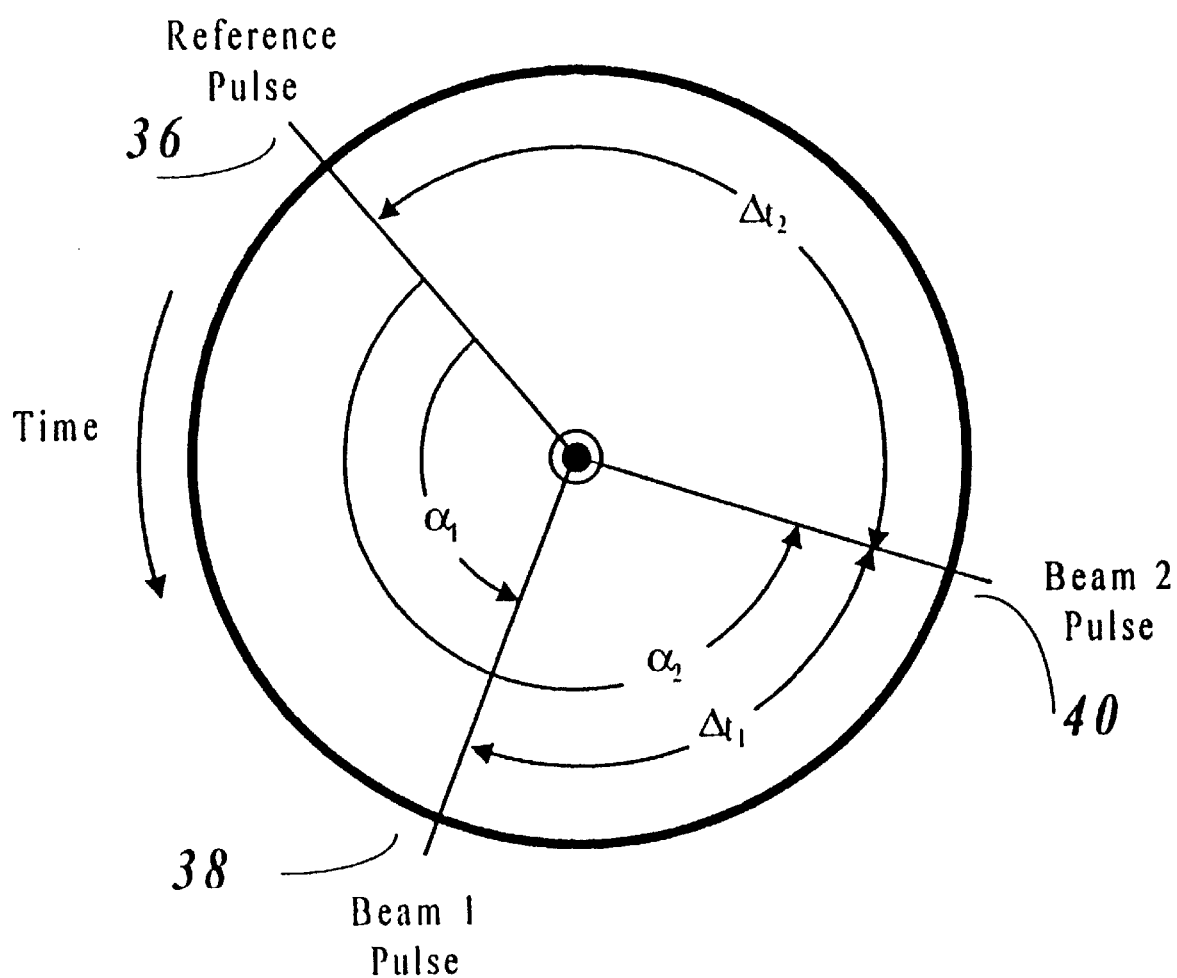
FIG. 14 is a time plot of the pulse sequence during a single rotation of an optical transmitter in accordance with applicants' improved apparatus and method.
Figure 15:
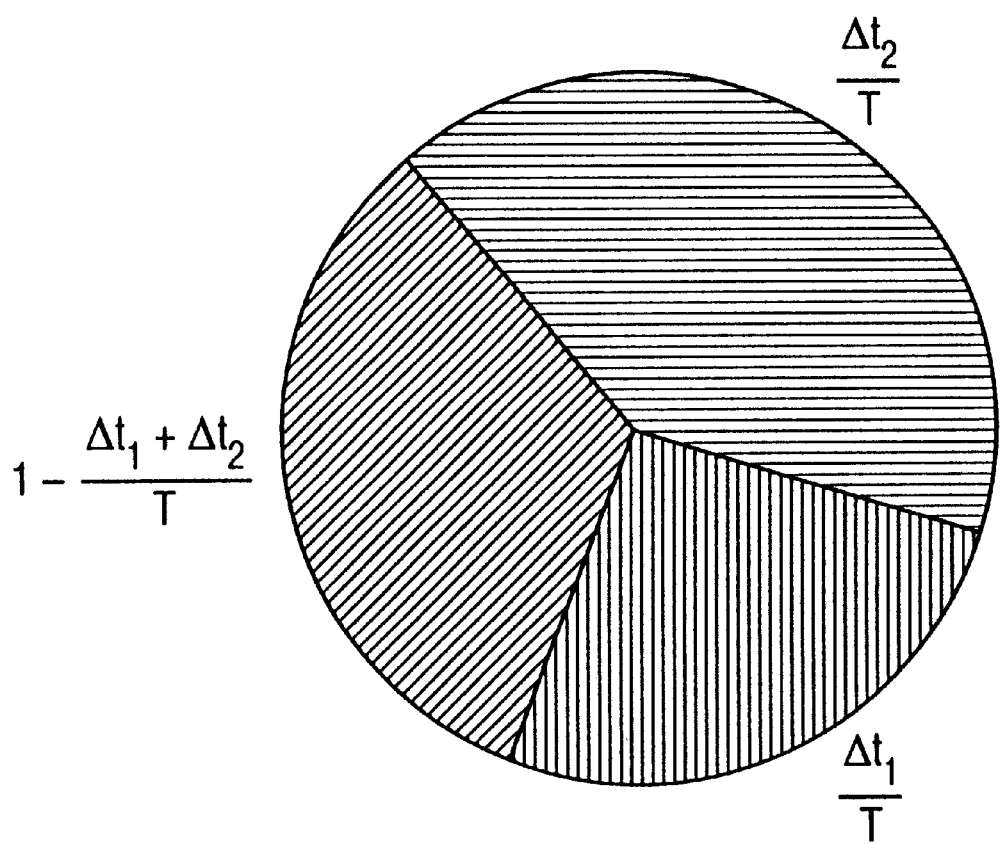
FIG. 15 is a graphical depiction of the pulses emitted during a single rotation of applicants' improved apparatus and method.

FIG. 14 relates these pulse time differences to angular differences. We take the above plot in time and view it as a circle of $2\pi$ radians representing one revolution of the transmitter head. We define two angular measurements, $\alpha_1$ and $\alpha_2$, as the angle between the optical reference pulse and laser beam 1 and beam 2 pulses, respectively. The reader should not confuse this circle with the actual rotating transmitter head. This circle shows a plot in time and respective angle as viewed by the detector. Using the measured time intervals $\Delta t_1$ and $\Delta t_2$ and the fact that the transmitter completes one revolution in T seconds, we can calculate $\alpha_1$ and $\alpha_2$ by splitting the circle into percentages, as shown in FIG. 15.

Using these percentages and the fact that there are $2\pi$ radians in a single head revolution, we get the following equations for $\alpha_1$ and $\alpha_2$:

$$\alpha_1 = 2\pi\left(1 - \frac{\Delta t_1 + \Delta t_2}{T}\right)$$

$$\alpha_2 = 2\pi\left(1 - \frac{\Delta t_1 + \Delta t_2}{T} + \frac{\Delta t_1}{T}\right) = 2\pi\left(1 - \frac{\Delta t_2}{T}\right)$$

Note that the reason the time intervals are measured from beam 1 rather than the reference pulse is to provide backward compatibility in the receiver system software for other versions of a transmitter; however this could be changed as desired.

For two important reasons, $\alpha_1$ and $\alpha_2$ are not exactly equivalent to the $\theta_1$ and $\theta_2$ angles described in the transmitter model above. First, in the model the two beams are not separated in azimuth. Rather, they scan together while overlapped as illustrated in FIG. 9. In the actual transmitter, we separate the two beams azimuthally on the head so that the receiver system can differentiate between them. We define this angular separation $\theta_{Off}$ as described herein above. Therefore, we must subtract $\theta_{off}$ from $\alpha_2$ to line $\alpha_2$ up with $\alpha_1$. As previously stated, $\theta_{Off}$ is determined through factory calibration.

Figure 16:
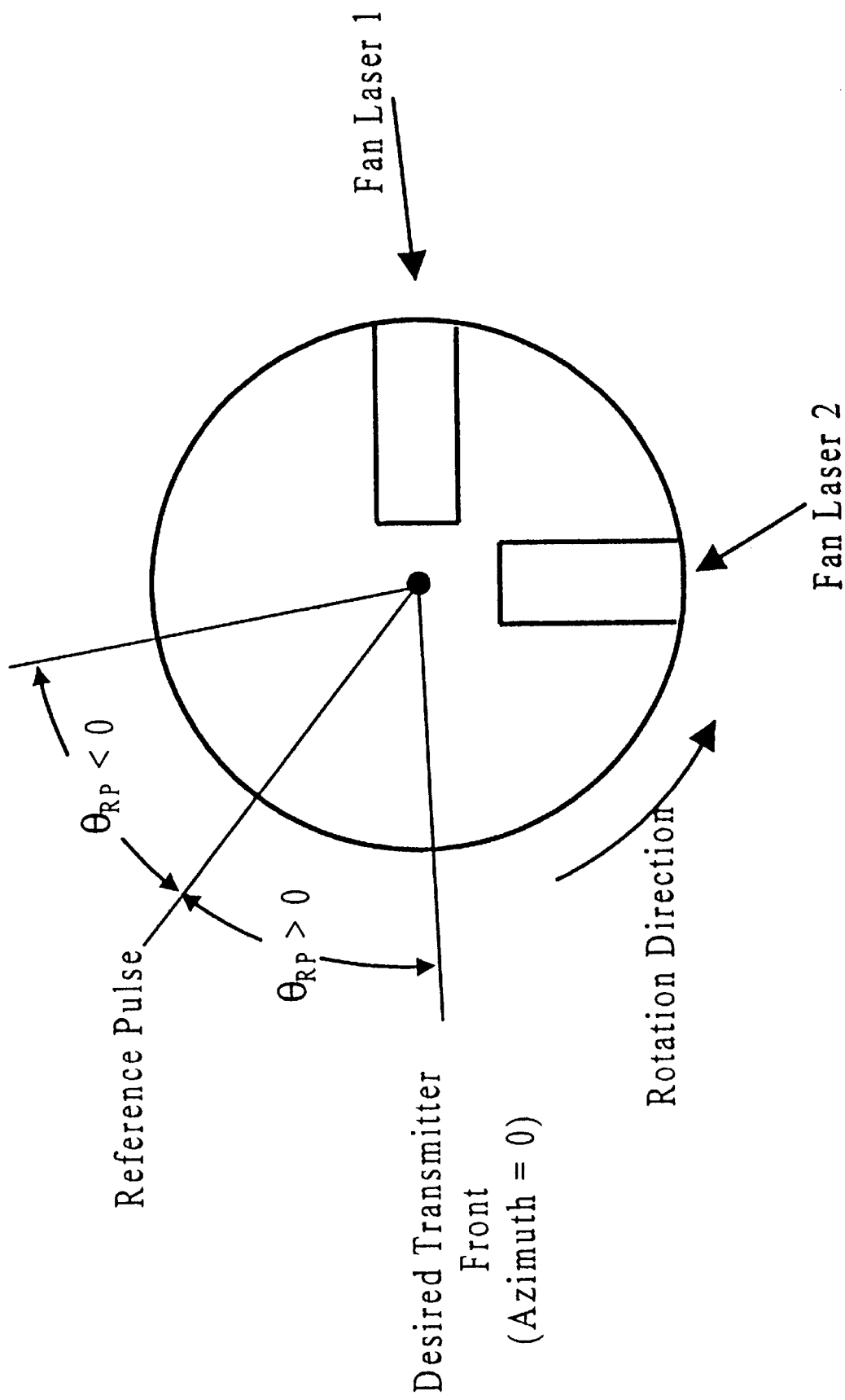
FIG. 16 is a top view of applicants' improved transmitter illustrating the preferred positioning of the transmitter front and the zero-azimuth plane of the improved transmitter.

Second, the $\alpha_1$ and $\alpha_2$ angles are measured relative to the reference pulse as shown in FIG. 14. If we relate this measurement to the transmitter model, then the front of the transmitter—its local x-axis—is the point in the head's rotation when the reference pulse 36 fires. Therefore, the reference pulse 36 also defines the zero-azimuth plane, since azimuth is measured from the transmitter's x-axis. If a single transmitter is to be used for azimuth and elevation calculations, it is sometimes desirable to set the point on the transmitter where the detector's azimuth will be zero. We establish this set point with a factory-calibrated constant called $\theta_{RP}$. As shown in FIG. 16, $\theta_{RP}$ is the angular separation between the desired front of the transmitter and the occurrence of the reference pulse. The sign of $\theta_{RP}$ is determined as illustrated. For most transmitters, $\theta_{RP}$ is set to zero because azimuth-elevation measurements relative to a single transmitter are not required. Therefore, we convert $\alpha_1$ and $\alpha_2$ to the desired the scan angles, $\theta_1$ and $\theta_2$, by using the following two equations:

$$\theta_1 = 2\pi\left(1 - \frac{\Delta t_1 + \Delta t_2}{T}\right) + \theta_{RP}$$

$$\theta_2 = \alpha_2 + \theta_{RP} - \theta_{Off}$$

$$\theta_2 = 2\pi\left(1 - \frac{\Delta t_2}{T}\right) + \theta_{RP} - \theta_{Off}$$

To summarize, these equations are used to calculate $\theta_1$ and $\theta_2$ values for each transmitter that illuminates a detector 24. Therefore, if there are two transmitters set up in the workspace, four $\theta$ angles will be calculated for each detector, and hence four $\hat{v}$ vectors will be calculated. Three transmitters would result in six $\hat{v}$ vectors, and so on. Using all of the calculated vectors, the receiver system then performs the matrix solve presented herein above for each detector 24 on the tool.

4. Transmitter Calibration Facility

For the improved ArcSecond three-dimensional measurement system to function, four transmitter 10 parameters must be supplied to the receiver 24:

1. The speed of the transmitter,
2. The angle of the first fan beam ($\Phi 1$)
3. The angle of the second fan beam ($\Phi 2$)
4. The angle between the beams when the transmitter is level ($\Theta_{off}$)

The user may adjust the speed of the transmitter 10 by controlling the phase-locked-loop motor controller schematically shown in FIG. 3; however, the three angular parameters as described above are preferably supplied as part of the assembly or manufacturing process. Two options are available: (a) build the transmitter in a very precise manner such that the angles can be inferred from the manufacturing process, or (b) build the transmitter with reasonable precision and then determine the angles through a calibration process. The second approach is much more cost effective.

To generate the numbers the transmitter must be put into a calibration facility that has several critical characteristics:

1. The resulting calibration numbers must represent the dynamic, actual in-use parameters. This requirement forces the sensors 40, 42 and 44 to be some distance away from the transmitter, normally more than 1 meter.
2. The calibration facility must be simple to use. This requirement forces the development of transmitter mounting and centering techniques in addition to the use of gauge blocks to assure repeatable measurements
3. The calibration facility must measure the numbers with precision, specifically with a precision greater than one arcsecond. This requires the measurement to be done with precision and with sufficient averaging to meet the requirements. This also requires that measurements be done at +/−180 degrees with respect to the transmitter to remove residual offset errors (similar to the well known process of "plunging the scope" used with theodolites).
4. The calibration facility must be "calibrated". In other words it is a requirement that the calibration of the facility be traceable to applicable national standards.

The calibration facility process preferred by applicant meets all of these difficult requirements.

A. Detailed Description

Figure 17A:
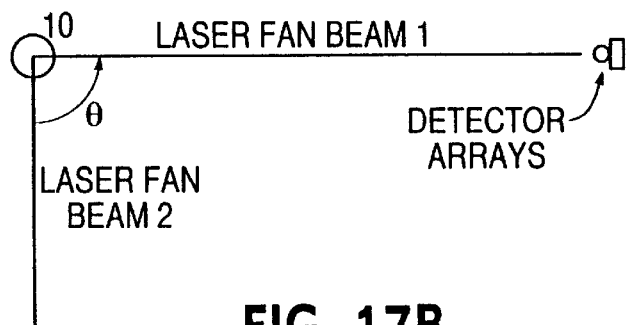
FIGS. 17A and 17B are schematic views of a calibration facility usable in accordance with aspects of applicants' invention.
Figure 17B:
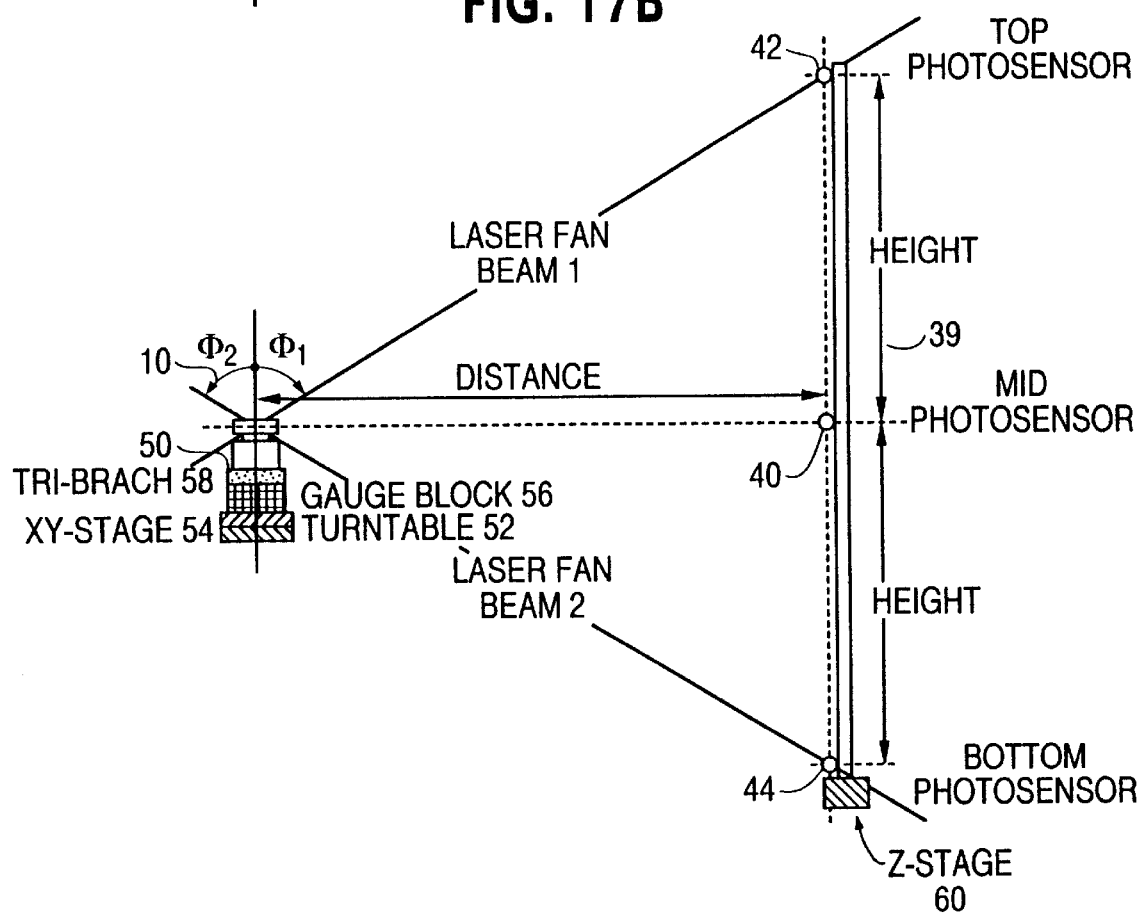

To meet all of the above requirements and based on our past experience, the calibration facility illustrated in FIGS. 17A and 17B was developed. It is well known that the best optical measurements can be accomplished with optical tables. These tables may be made of granite to provide stable measurement platforms. Optical supply companies, such as the Newport Corporation, have developed a reasonable substitution, optical bars. These bars are designed for building open structures that approach the measurement properties of optical tables. For our purposes, the bars, not shown, also provide the obvious advantage that they form an open frame. A design based on an optical table would not allow negative elevation angles to be measured easily in that the table would likely cause blockage. With the optical bars, both positive and negative elevation angles are easily accommodated. The optical bars also allow the facility to be large enough to meet the >1 meter requirement.

As shown in FIG. 17B, the transmitter 10 is preferably mounted on top of a tower 50. The base of the tower is a turntable 52 that allows the entire tower to be rotated under computer control. The layer 54 above the turntable is a precision XY table that is used to center the transmitter. The next layer is a gauge block 56 that facilitates positioning the transmitter in the center of the measurement field. This block 56 allows transmitters of different height to be accommodated. The final layer is a tri-brach 58 adapter, as used in surveying. The adapter allows the transmitter to be tilted with precision using the screws at each of the three corners.

After the transmitter 10 is mounted it is aligned to the fixture using an optical level not shown. The level allows the center line of the lasers to be brought to the same level as the center detector 40 of the detector array. To facilitate this measurement, marks are preferably placed on both the rotating head of the transmitter and the array. If adjustments are needed, the vertical array may be moved using a z-adjustment-table 60 at the bottom of the array.

Dynamic centering of the transmitter's rotating head is preferably accomplished with two inductive probes not shown mounted 90 deg with respect to each other. The system is designed so that the probes can be moved into position while the transmitter is rotating. If the transmitter is off center, the XY table 54 allows the proper adjustments.

After these adjustments the transmitters are ready for calibration. The detector array 39 is used to measure the time-strikes as the laser beams pass the array. At least three detectors 40,42,44 of array 39 are preferably used to properly measure the fan angle. Only two would be required in a perfect measurement system. The addition of the third detector compensates or accounts for residual misalignments. The measurements are accomplished using an oscilloscope as will be understood by those skilled in the art. The detectors are mounted with precision into the detector array. They are then surveyed in to determine their precise location. To minimize the offsets caused in the detectors, any windows are removed. The required precision is enhanced by optimizing the sampling rate of the scope and using the time delay function available in modern oscilloscopes. Averaging is used to meet the measurement accuracy requirements.

B. Calibration Software Algorithm

The intent of the calibration software is to analyze the digitized waveforms of the laser strikes across the photosensors, and determine the following specifications of the transmitter under test:

1. The speed of the transmitter (Speed)
2. The angle of the first laser fan beam ($\Phi_1$)
3. The angle of the second laser fan beam ($\Phi_2$)
4. The angle between the beams when the transmitter is level ($\Theta_{off}$)

All the needed parameters can be determined in 3 steps:

1. Capture the waveforms from 2 laser beams on 3 photosensors in a vertical linear array.
2. Measure the time differences of the center points of the lasers in relation to each other
3. Calculate the desired angles as described hereinabove using these time measurements and the constant measured distances of the center of the transmitter to the mid photosensor and the top to bottom photosensor distance The first step may be accomplished utilizing a commercially available digitizer with three channels running at 15 MHz or above. Each channel captures one full rotation of the transmitter; digitizing the laser one pulse, the laser two pulse and the following laser 1 pulse. All pulses from all channels must be referenced to the same point in time in order to determine the following correlating measurements.

1. Determine the approximate time each laser strike occurs in the waveforms
2. In order to get a more precise time measurement for each pulse, delay the oscilloscope by these approximate times to capture each laser pulse in 40 ns resolution.
3. Determine the relative time of each pulse center in relation to the other pulses The second step requires the determination of the following times:

topLaser1=Top Sensor Laser1 time
topLaser2=Top Sensor Laser2 time
topPeriod=Top Laser 1 to Top Laser 1 time
midLaser1=Mid Sensor Laser1 time
midLaser2=Mid Sensor Laser2 time
midPeriod=Mid Laser 1 to Mid Laser 1 time
lowLaser1=Bottom Sensor Laser1 time
lowLaser2=Bottom Sensor Laser2 time
lowPeriod=Bottom Laser 1 to Bottom Laser 1 time
Period=(topPeriod+midPeriod+lowPeriod)/3

The third step derives the above identified parameters with the measured distances DISTANCE=distance from center of transmitter at the laser's axis to the Mid Sensor
HEIGHT=(distance from Top Sensor to Bottom Sensor)/2
Top$\Phi_1$=−atan[(DISTANCE/HEIGHT)*sin((midLaser1−topLaser1)*2.0*PI/Period)]
Top$\Phi_2$=−atan[(DISTANCE/HEIGHT)*sin((lowLaser1−midLaser1)*2.0*PI/Period)]
Bottom$\Phi_1$=−atan[(DISTANCE/HEIGHT)*sin((midLaser1−topLaser1)*2.0*PI/Period)]
Bottom$\Phi_2$=−atan[(DISTANCE/HEIGHT)*sin((lowLaser1−midLaser1)*2.0*PI/Period)]
Speed=1/Period
$\Phi_1$=(Top$\Phi_1$+Bottom$\Phi_1$)/2
$\Phi2$=(Top$\Phi_2$+Bottom$\Phi_2$)/2
$\Theta_{off}$=(midLaser2−midLaser1)/Period*2*PI

5. Low Cost Manufacturing

Preferably, the motor 65 is a brush-less sine wave drive motor. A sine wave drive motor, such as those found in VCRs, is a low-cost motor with good inherent intra-revolution stability and, as such, is useful in ensuring constant velocity rotation. The bearing separation should be maximized to achieve optimal results. Any precision and wobble, similar to wow and flutter in a turntable, will be a source of error in the system. It will lead directly to an error in the "z" direction. Using two precision bearings and maximizing the distance between the bearings can minimize these errors. The inertia of the rotating head also serves to maintain a constant angular velocity through each rotation.

The optical encoder disk is used to give rotation information. Other devices, including without limitation, tachometers and synchros could be used. The optical encoder disk is typically made of glass and has a series of 1000 radial chromium marks on it which are detected as the disk rotates. Additionally, the disk typically has a single "index" mark of a different radius which is used to detect complete rotations. The disk system produces a square wave with a frequency dictated by the speed with which the radial marks are passing. For example, if the disk is rotating at 1 revolution/second, the disk system would produce a 1000 Hz square wave (1000 radial marks/revolution*1 revolution/second=1000 Hz).

The speed of the transmitter is controlled through a feedback phase-locked loop ("PLL") system. The disk system square wave is one input and a clock from the transmitter system is the other input. The transmitter clock has a selectable frequency. The output of the PLL is used to control the speed of rotation such that the PLL remains locked at the selected frequency. Using such a circuit, speed stability better than 1:200000 and up to 1:1000000 can be achieved. This would imply that for a rotation rate of 50 Hz that the 1 sigma speed stability would be 100 nSec for a speed stability of 1:200000.

As more fully described above regarding the calibration facility, the transmitter 10 needs to be stable. Further, it is important for the receiving instrument to know, with precision, the operating parameters of the transmitter 10. The present manufacturing process for the transmitter 10 specifies these operating parameters e.g. laser positioning and slant angles with less precision than that required by the receiving instruments 24. This allows the manufacturing process to be relatively inexpensive. The required precision is obtained in the calibration process, which utilizes the calibration facility described above.

6. Receiver/Detector

Figure 18A:
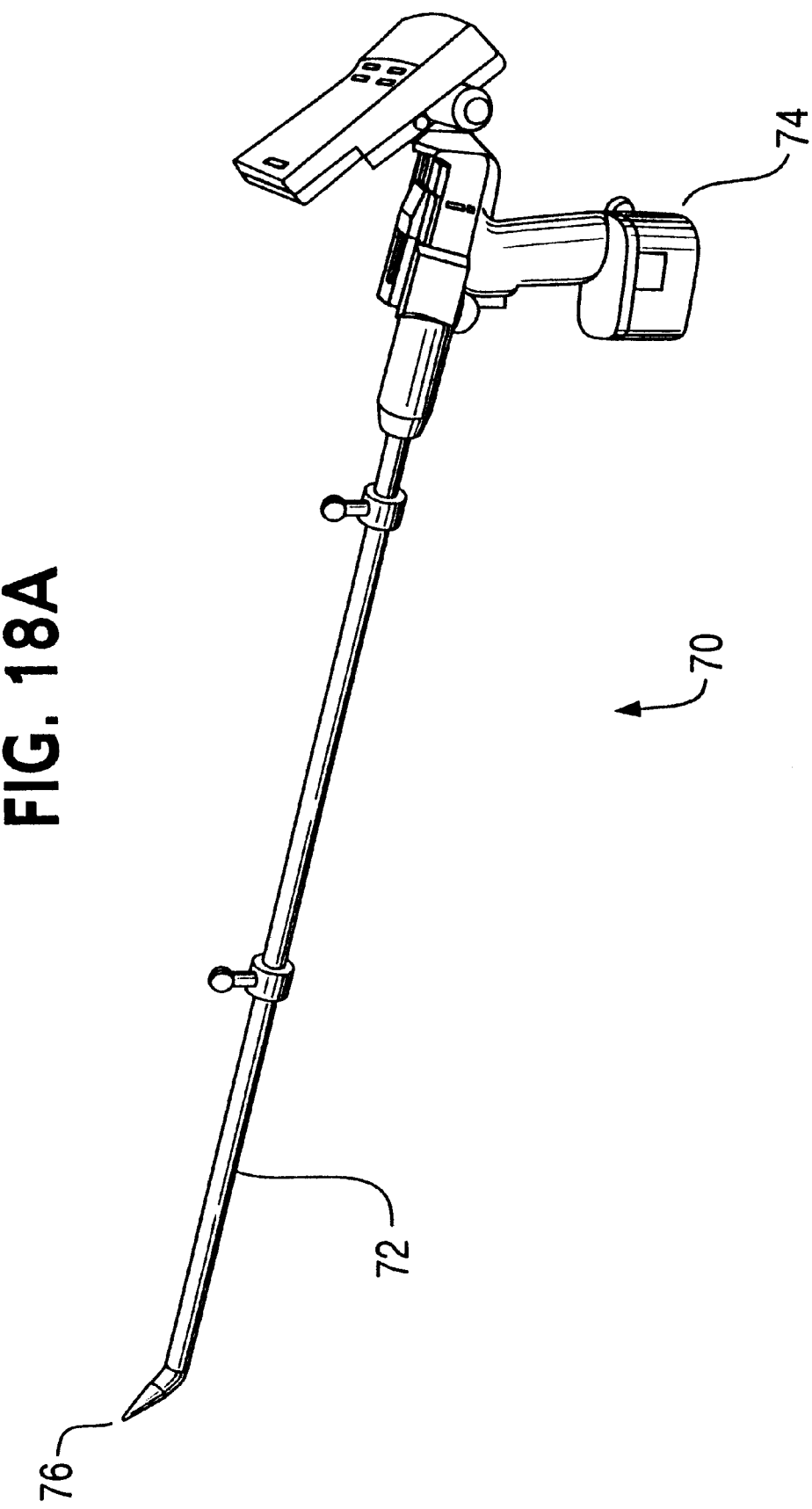
Figure 19:
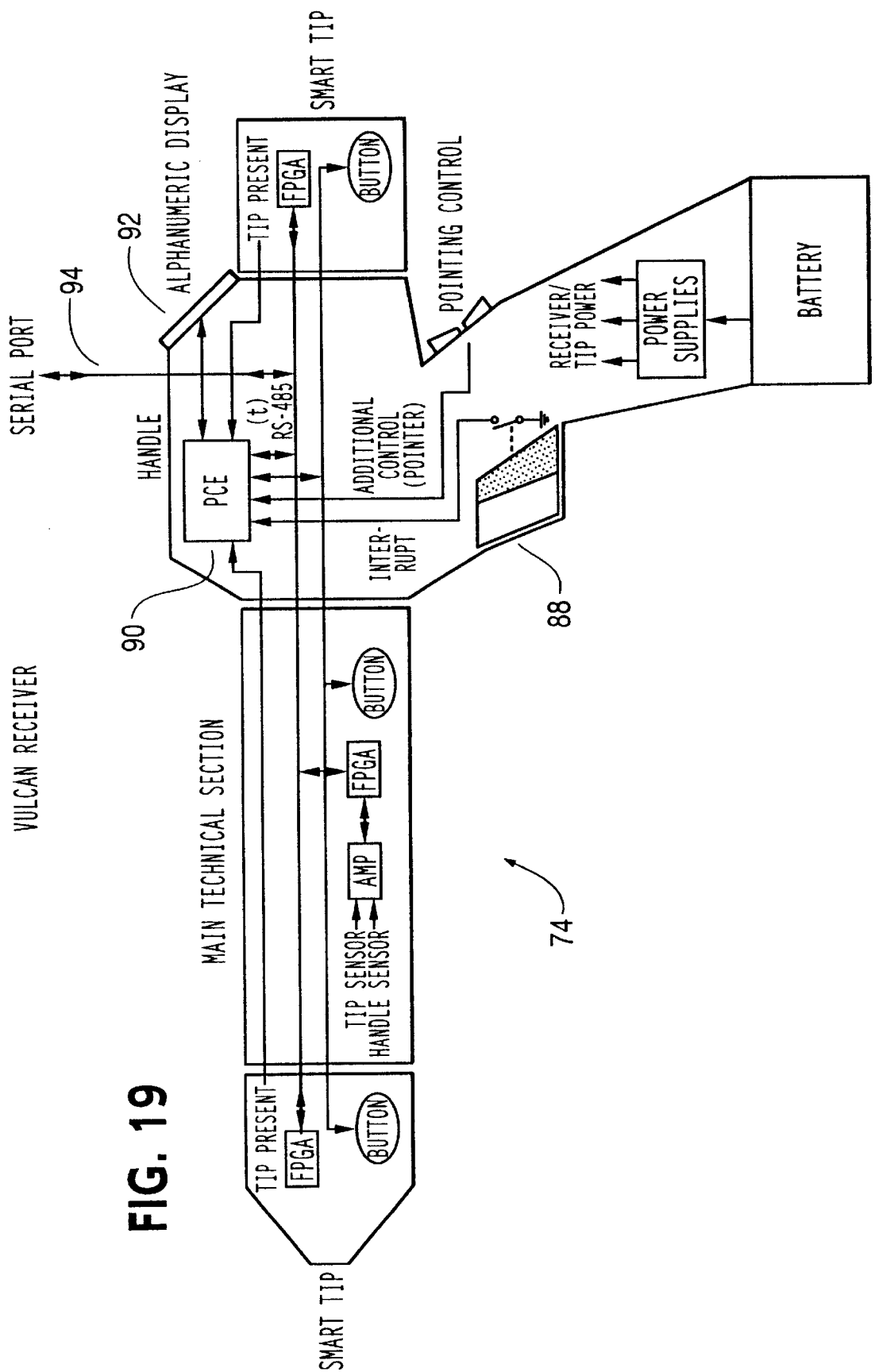
FIG. 19 is a block diagram of a position calculating system utilizable in accordance with applicants' inventions.

With reference to FIGS. 18A, 18B and 19, a typical receiver/detector 24 will be described. There are a number of types of optical receiver units which may be utilized with applicants' improved low cost optical transmitter 10 to form a position measurement system of the type shown schematically in FIG. 12. For further examples of other types of usable receiver/detector units reference may be had to U.S. Pat. No. 5,247,487 or U.S. Pat. No. 5,110,202, both of which are owned by the assignee of the present inventions and are incorporated herein by reference.

In the spatial position measurement system shown in FIG. 12, the receiver 24, which includes the data gathering apparatus, may comprise the portable wand-shaped receiver 70 shown in FIG. 18A, which is the Vulcan walk-around receiver hereinabove described. Receiver 70 includes a rod or wand-shaped section 72 and a handle section 74. Rod section 72 terminates in a sensor point 76 which is utilized to touch or contact a position within the measurement field for which x-y-z data is to be generated.

Referring now to FIG. 18B, the rod section 72 includes two spherically shaped, spaced apart optical detectors 78 and 80 and an electronics section 82. The proper alignment and positioning of the sensor point 76 with the detectors 78 and 80 can be mathematically expressed as:

$$\vec{P}_{TIP} = d_{TIP}\frac{\vec{P}_{DET2} - \vec{P}_{DET1}}{\|\vec{P}_{DET2} - \vec{P}_{DET1}\|} + \vec{P}_{DET2}$$

where:

$\vec{p}_{TIP}$=is the position of the tip 76

$\vec{p}_{DET2}$=is the position of the detector 80 closest to the wand handle 82

$\vec{p}_{DET2}$=is the position of the detector 78 closest to the tip 76

$d_{tip}$=is the distance 72 from detector-2 78 to the tip 76.

Proper alignment and spacing of the detector 78 and 80 relative to the sensor tip 76 along projection line 84 as shown in FIG. 18B is an important aspect of applicants' improved position measurement system as it permits a user, not shown, to take accurate measurements within a measurement field or space without having the receiver 24 positioned exactly perpendicular to a transmitter reference plane (See FIG. 12) or any particular user reference plane. In fact utilizing a wand tip 76 designed as hereinabove described, permits a user to position the receiver/detector wand tip 76 and receiver/detector 24 without concern for any particular alignment.

Referring now to FIG. 19, the hand grip section 74 of portable receiver 70 of FIG. 18A will now be described. Receiver handle section 74 includes a trigger switch 88 to activate the receiver 70 to initiate x-y-z data generation in response to illumination of detectors 78 and 80 by two or more transmitters 10. This x-y-z position data may be generated when electric signals emanating from detector 78 and 80 activate or are inputted to an internal programmed computer 90. The x-y-z position data corresponding to position of the sensor point tip 76 when trigger 88 is activated. This position data may be displayed in a display panel 92 and/or transferred to another data processor, not shown, via output data port 94, as will be understood by those skilled in the data processing arts.

INDUSTRIAL APPLICATION

As is clear from the present disclosure, the present invention can be applied to a variety of different fields, applications, industries, and technologies. The present invention can be used, without limitation, with any system in which information related to position must be determined, including without limitation movement, dimensional measurement, and position and orientation tracking. This includes without limitation many different processes and applications involved in myriad industries. Some of these industries and some of their associated processes or applications are: film making (digitizing models, virtual sets, camera tracking, automatic focusing), construction (trades, power tools, surveying, CAD, equipment control, construction measurement and layout), robotics (robot calibration, work cell configuration, mobile robot navigation, hazardous waste excavation), law enforcement (accident scene mapping, crime scene mapping, incident reconstruction), computers (3D input devices, video games), virtual reality (augmented reality, virtual arcades, 3D Internet experiences), manufacturing (factory automation, facility decommissioning, parts inspection, facility maintenance, manufacturing tooling and inspection, manufacturing measurement), medical (surgical navigation, smart operating rooms, medical instrumentation), and defense (ordnance modeling, simulation training, aircraft fit-checks, ship retrofit and repair, site remediation).

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

We claim:

1. An optical transmitter for use in a position measurement system that generates x-y-z data within a measurement field, said system including means for calculating the x-y-z data at any point in the measurement field using beams from a plurality of rotatably supported optical transmitters, the optical transmitter comprising:
   at least one optical source that generates at least one rotating substantially fan shaped beam;
   a strobe that generates a strobe pulse at a predetermined point in the rotation of said at least one fan shaped beam;
   a memory, disposed in said optical transmitter, containing calibration data unique to said transmitter, said calibration data defining a relative position of the fan beams generated by the optical transmitter; and
   an output port for outputting the calibration data to identify the transmitter.

2. The optical transmitter of claim 1, wherein said calibration data defines at least one of an angular separation between said laser and a tilt angle for each of said fan beams measured from a vertical axis of said transmitter.

3. The optical transmitter of claim 1, wherein said strobe defines a zero reference for the rotation of said transmitter.

4. The optical transmitter of claim 1, wherein the calibration data further includes data that uniquely defines a rotational velocity of the transmitter.

5. The optical transmitter of claim 4, wherein said rotational velocity calibration data is unique for each transmitter in the system and enables the means for calculating x-y-z data to differentiate between transmitters operating within said measurement field.

6. The optical transmitter of claim 1, wherein said means for calculating said x-y-z data comprise a matrix calculation means wherein matrix notation for said calculation can be represented as follows:

$$A_{2n \times 3} \vec{p}_{3 \times 1} = \vec{b}_{2n \times 1}$$

wherein the subscripts indicate dimensions of the matrix and the x-y-z data is calculated by solving the above equation for $\rho$.

7. The optical transmitter of claim 1, wherein said output port is a wireless data port for communicating said calibration data to another device within said position measuring system.

8. An optical transmitter for a position measuring system that generates x-y-z data within a defined measurement field, said transmitter comprising:
   a radiation source for generating a pair of substantially fan shaped beams;
   a motor for rotating said fan beams to sweep said measurement field at a predetermined rotational velocity;
   a reference signal source for propagating an azimuth reference signal at predetermined intervals of rotation of said fan beams;
   a memory unit, physically associated with said transmitter, containing calibration data defining a relative position of the fan beans generated by the optical transmitter and unique to that transmitter; and
   an output port for outputting the calibration data to identify the transmitter to another device within said position measuring system.

9. The optical transmitter of claim 8, wherein said output port is a wireless data port.

10. The optical transmitter of claim 8, further comprising a velocity control for selectively controlling said motor to selectively alter the rotational velocity of said fan beams.

11. The optical transmitter of claim 10, wherein said velocity control comprises a rotary transformer controllable by phase-locked loop feedback means.

12. The optical transmitter of claim 8, wherein said memory unit comprises a digital memory that stores calibration data which defines an angular separation between said fan beams and a vertical tilt angle for each fan beam unique to said transmitter.

13. The optical transmitter of claim 8, wherein the memory unit also stores calibration data including said rotational velocity of said fan beams.

14. The optical transmitter of claim 8, wherein said reference signal defines a beginning reference for the rotation of said fan beams.

15. The optical transmitter of claim 10, wherein said velocity control comprises a programmable logic gate array.

16. An optical transmitter for use in a position measurement system that generates x-y-z data within a measurement field, said system including means for calculating the x-y-z data at any point in the measurement field using beams from a plurality of rotatably supported optical transmitters, the optical transmitter comprising:
   at least one radiation source that generates at least one rotating substantially fan shaped beam;
   a strobe that generates a strobe pulse at a predetermined point in the rotation of said at least one fan shaped beam; and
   a memory unit, connected to said optical transmitter, containing calibration data uniquely defining a relative position of the fan beams generated by the optical transmitter.

17. The transmitter of claim 16, wherein said memory unit further comprises an output port for outputting the calibration data to said means for calculating the x-y-z data.

18. The transmitter of claim 16, wherein said connection between said memory unit and said optical transmitter is an electrical connection.

19. The transmitter of claim 16, wherein said connection between said memory unit and said optical transmitter is an physical, non-electrical connection.

20. The transmitter of claim 16, wherein said memory unit further comprises means for inputting the calibration data to said means for calculating the x-y-z data.

* * * * *

UNITED STATES PATENT AND TRADEMARK OFFICE
CERTIFICATE OF CORRECTION

PATENT NO. : 6,519,029 B1
DATED : February 11, 2003
INVENTOR(S) : Thomas M. Hedges et al.

It is certified that error appears in the above-identified patent and that said Letters Patent is hereby corrected as shown below:

Column 20,
Line 9, change "position of the fan beans" to -- position of the fan beams --.

Signed and Sealed this

Sixth Day of May, 2003

JAMES E. ROGAN
*Director of the United States Patent and Trademark Office*